US010545471B2

United States Patent
Fujimura et al.

(10) Patent No.: US 10,545,471 B2
(45) Date of Patent: Jan. 28, 2020

(54) EVALUATION SYSTEM, SAFETY CONTROLLER, COMPUTER READABLE STORAGE MEDIUM, AND EVALUATION METHOD

(71) Applicant: OMRON Corporation, Kyoto (JP)

(72) Inventors: Ryosuke Fujimura, Kusatsu (JP); Nobuyuki Takuma, Kusatsu (JP); Hiromu Suganuma, Ritto (JP); Asahi Matsui, Takatsuki (JP); Masaya Inoue, Yokohama (JP)

(73) Assignee: OMRON Corporation, Kyoto (JP)

( * ) Notice: Subject to any disclaimer, the term of this patent is extended or adjusted under 35 U.S.C. 154(b) by 52 days.

(21) Appl. No.: 15/869,037

(22) Filed: Jan. 12, 2018

(65) Prior Publication Data
US 2018/0259925 A1  Sep. 13, 2018

(30) Foreign Application Priority Data

Mar. 13, 2017  (JP) .................................. 2017-047658

(51) Int. Cl.
*G05B 19/042* (2006.01)
*G05B 19/048* (2006.01)
(Continued)

(52) U.S. Cl.
CPC ........ *G05B 19/0425* (2013.01); *B25J 9/1674* (2013.01); *G05B 9/02* (2013.01);
(Continued)

(58) Field of Classification Search
USPC ...................................... 340/573.1, 506, 507
See application file for complete search history.

(56) References Cited

U.S. PATENT DOCUMENTS

2018/0004181 A1*  1/2018  Ueda ................... G05B 19/0428
2018/0259925 A1*  9/2018  Fujimura ........... G05B 19/0428

FOREIGN PATENT DOCUMENTS

DE       102005050979    5/2006
EP            0610711    8/1994
(Continued)

OTHER PUBLICATIONS

Office Action of Europe Counterpart Application, dated Nov. 27, 2018, pp. 1-5.
(Continued)

*Primary Examiner* — Brent Swarthout
(74) *Attorney, Agent, or Firm* — JCIPRNET

(57) ABSTRACT

An evaluation system includes: processing execution means for executing computation in accordance with a safety program; setting means for receiving an input signal of an evaluation target and an expected output value; first determination means for determining whether or not a first output value of an output signal decided by the processing execution means coincides with the expected output value based on reception of a change in the value of the input signal from a first input value to a second input value from an input device; second determination means for determining whether or not a second output value of an output signal decided by the processing execution means coincides with the first output value based on reception of returning of the value of the input signal from the second input value to the first input value from the input device; and output means for outputting determination results.

20 Claims, 24 Drawing Sheets

(51) Int. Cl.
*G05B 9/02* (2006.01)
*B25J 9/16* (2006.01)
(52) U.S. Cl.
CPC ....... *G05B 19/048* (2013.01); *G05B 19/0428* (2013.01); *G05B 2219/24024* (2013.01); *G05B 2219/24038* (2013.01)

(56) References Cited

FOREIGN PATENT DOCUMENTS

| JP | 2014137621 | 7/2014 |
| WO | 2009105889 | 9/2009 |

OTHER PUBLICATIONS

"Search Report of European Counterpart Application" dated Jul. 20, 2018, p. 1-p. 8.
Office Action of Europe Counterpart Application, dated Mar. 18, 2019, pp. 1-4.

* cited by examiner

FIG. 13

Last executed date and time: 2017/01/21 10:04:24

| No. | Variable | Comment | Reset Type | ServoA01 Contactor | ServoA02 Contactor | ServoB01 Contactor | ServoB02 Contactor | Test Result | Remarks | Executed Date |
|---|---|---|---|---|---|---|---|---|---|---|
| 1 | ZoneA_EmergencyStop | emergency stop | Manual | 0 | 0 | 0 | 0 | | | |
| 2 | ZoneA_Reset | reset button | Manual | 1 | 1 | 1 | 1 | | | |
| 3 | ZoneA_LightCurtain01 | light curtain | Manual | 0 | 0 | 1 | 1 | | | |
| 4 | ZoneB_LightCurtain01 | light curtain | Manual | 1 | 1 | 0 | 1 | | | |
| 5 | ZoneA_LaserScanner01 | laser scanner | Auto | 1 | 1 | 1 | 0 | | | |
| 6 | ZoneB_LaserScanner01 | laser scanner | Auto | 1 | 1 | 0 | 1 | | | |
| 7 | ZoneC_SafetyLimitSwitch | limit switch | Manual | 0 | 1 | 1 | 1 | | | |

| No. | Variable | Comment | Reset Type | Contactor | Test Result | Remarks | Executed Date |
|---|---|---|---|---|---|---|---|
| 1 | ZoneA_EmergencyStop | emergency stop | Manual | | | | |
| 2 | ZoneA_Reset | reset button | Manual | | | | |
| 3 | ZoneA_LightCurtain01 | light curtain | Manual | | | | |
| 4 | ZoneB_LightCurtain01 | light curtain | Manual | | | | |
| 5 | ZoneA_LaserScanner01 | laser scanner | Auto | | | | |
| 6 | ZoneB_LaserScanner01 | laser scanner | Auto | | | | |
| 7 | ZoneC_SafetyLimitSwitch | limit switch | Manual | | | | |

Last executed date and time: 2017/01/21 10:04:24 operation of input device (block) ✕ please operate device to which the following variable has been assigned and set the value of the variable to FALSE variable name : ZoneA_EmergencyStop
comments: emergency stop
reset type : Manual

[ OK ]  [ cancel ]

FIG. 16

| No. | Variable | Comment | Reset Type | Contactor | Test Result | Remarks | Executed Date |
|---|---|---|---|---|---|---|---|
| 1 | ZoneA_EmergencyStop | emergency stop | Manual | | | | |
| 2 | ZoneA_Reset | reset button | Manual | | | | |
| 3 | ZoneA_LightCurtain01 | light curtain | Manual | | | | |
| 4 | ZoneB_LightCurtain01 | light curtain | Manual | | | | |
| 5 | ZoneB_LaserScanner01 | laser scanner | Auto | | | | |
| 6 | ZoneB_LaserScanner01 | laser scanner | Auto | | | | |
| 7 | ZoneC_SafetyLimitSwitch | limit switch/limit switch | Manual | | | | |

Last executed date and time: 2017/01/21 10:04:24 operation of input device (restoration)

please operate device to which the following variable has been assigned and set the value of the variable to TRUE variable name : ZoneA_EmergencyStop
comments: emergency stop
reset type : Manual

[OK]  [cancel]

FIG. 17

| No. | Variable | Comment | Reset Type | ServoA01 Contactor | ServoA02 Contactor | ServoB01 Contactor | ServoB02 Contactor | Test Result | Remarks | Executed Date |
|---|---|---|---|---|---|---|---|---|---|---|
| 1 | ZoneA_EmergencyStop | emergency stop | Manual | 0 | 1 | 0 | 1 | Passed | | 2017/01/21 10:04:24 |
| 2 | ZoneA_Reset | reset button | Manual | 1 | 0 | 1 | 0 | | | |
| 3 | ZoneA_LightCurtain01 | light curtain | Manual | 0 | 0 | 1 | 1 | | | |
| 4 | ZoneB_LightCurtain01 | light curtain | Manual | 1 | 1 | 0 | 0 | | | |
| 5 | ZoneA_LaserScanner01 | laser scanner | Auto | 1 | 1 | 1 | 1 | | | |
| 6 | ZoneB_LaserScanner01 | laser scanner | Auto | 1 | 1 | 0 | 0 | | | |
| 7 | ZoneC_SafetyLimitSwitch | limit switch | Manual | 0 | 1 | 1 | 1 | | | |

Last executed date and time: 2017/01/21 10:04:24

FIG. 18

| No. | Variable | Comment | Reset Type | | Test Result | Remarks | Executed Date |
|---|---|---|---|---|---|---|---|
| 1 | ZoneA_EmergencyStop | emergency stop | Manual | | Passed | | 2017/01/21 10:04:24 |
| 2 | ZoneA_Reset | reset button | Manual | | | | |
| 3 | ZoneA_LightCurtain01 | light curtain | Manual | | | | |
| 4 | ZoneB_LightCurtain01 | light curtain | Manual | | | | |
| 5 | ZoneA_LaserScanner01 | laser scanner | Auto | | | | |
| 6 | ZoneB_LaserScanner01 | laser scanner | Auto | | | | |
| 7 | ZoneC_SafetyLimitSwitch | limit switch/limit switch | Manual | | | | |

Last executed date and time: 2017/01/21 10:04:24

Dialog:
operation of reset device please operate the reset device to which the following variable has been assigned. please change the value of the variable in the order of FALSE → TRUE → FALSE.

variable name: ZoneA_Reset
comments: reset button

[OK] [cancel]

Last executed date and time: 2017/01/21 10:04:24       651

| No. | Variable | Comment | Reset Type | ServoA01_Contactor | ServoA02_Contactor | ServoB01_Contactor | ServoB02_Contactor | Test Result | Remarks | Executed Date |
|---|---|---|---|---|---|---|---|---|---|---|
| 1 | ZoneA_EmergencyStop | emergency stop | Manual | 0 | 1 | 0 | 1 | Passed | | 2017/01/21 10:04:24 |
| 2 | ZoneA_Reset | reset button | Manual | 1 | 0 | 1 | 0 | Passed | | 2017/01/21 10:04:24 |
| 3 | ZoneA_LightCurtain01 | light curtain | Manual | 0 | 1 | 1 | 1 | Passed | | 2017/01/21 10:04:24 |
| 4 | ZoneB_LightCurtain01 | light curtain | Manual | 1 | 0* | 1 | | Failed | the following output variable has automatically been restored. variable name: ServoA02_Contactor | 2017/01/21 10:04:24 |
| 5 | ZoneB_LaserScanner01 | laser scanner | Auto | 1 | 1 | 0 | 1 | Passed | | 2017/01/21 10:04:24 |
| 6 | ZoneB_LaserScanner01 | laser scanner | Auto | 0 | 1 | 1 | 0 | Passed | | 2017/01/21 10:04:24 |
| 7 | ZoneC_SafetyLimitSwitch | limit switch | Manual | 0 | 1 | 1 | 1 | Passed | | 2017/01/21 10:04:24 |

[EXPORT (E)]   [PRINT (P)]                                                                 [CLOSE (C)]

FIG. 19

| No. | Variable | Comment | Reset Type | ServoA01_Contactor | ServoA02_Contactor | ServoB01_Contactor | ServoB02_Contactor | Test Result | Check Result | Remarks | Executed Date |
|---|---|---|---|---|---|---|---|---|---|---|---|
| 1 | ZoneA_EmergencyStop | emergency stop | Manual | 0 | 0 | 0 | 0 | Passed | ☑ | | 2017/01/21 10:04:24 |
| 2 | ZoneA_Reset | reset button | Manual | 1 | 1 | 1 | 1 | Passed | ☐ | | 2017/01/21 10:04:24 |
| 3 | ZoneA_LightCurtain01 | light curtain | Manual | 1 | 1 | 1 | 1 | Passed | ☐ | the following output variable has automatically been restored variable name: ServoA02_Contactor | 2017/01/21 10:04:24 |
| 4 | ZoneB_LightCurtain01 | light curtain | Manual | 1 | 0* | 1 | 1 | Failed | ☐ | | |
| 5 | ZoneA_LaserScanner01 | laser scanner | Auto | 1 | 1 | 0 | 0 | Passed | ☐ | | 2017/01/21 10:04:24 |
| 6 | ZoneB_LaserScanner01 | laser scanner | Auto | 1 | 1 | 0 | 0 | Passed | ☐ | | 2017/01/21 10:04:24 |
| 7 | ZoneC_SafetyLimitSwitch | limit switch | Manual | 0 | 0 | 1 | 1 | Passed | ☐ | | 2017/01/21 10:04:24 |

EXPORT (E)   PRINT (P)   CLOSE (C)

FIG. 20

FIG. 21 result of online function test

Last executed date and time: 2017/01/21 10:04:24

| No. | Variable | Comment | Reset Type | ServoA01 Contactor | ServoA02 Contactor | ServoB01 Contactor | ServoB02 Contactor | Test Result | Check Result | Remarks | Executed Date |
|---|---|---|---|---|---|---|---|---|---|---|---|
| 1 | ZoneA_EmergencyStop | emergency stop | Manual | 0 | 0 | 0 | 0 | Passed | | | 2017/01/21 10:04:24 |
| 2 | ZoneA_Reset | reset button | Manual | 1 | 0 | 1 | 0 | Passed | | | 2017/01/21 10:04:24 |
| 3 | ZoneA_LightCurtain01 | light curtain | Manual | 0 | 1 | 0 | 1 | Passed | | | 2017/01/21 10:04:24 |
| 4 | ZoneB_LightCurtain01 | light curtain | Manual | 0* | | 1 | | Failed | | the following output variable has automatically variable name: ServoA02_Contactor | 2017/01/21 10:04:24 |
| 5 | ZoneA_LaserScanner01 | laser scanner | Auto | 1 | 1 | 0 | 1 | Passed | | | 2017/01/21 10:04:24 |
| 6 | ZoneB_LaserScanner01 | laser scanner | Auto | 1 | 1 | 0 | 1 | Passed | | | 2017/01/21 10:04:24 |
| 7 | ZoneC_SafetyLimitSwitch | limit switch | Manual | 0 | 1 | 0 | 1 | Passed | | | 2017/01/21 10:04:24 |

<date of evaluation>
2017/01/21 10:04:24

<evaluator>

<signature>

EVALUATION SYSTEM, SAFETY CONTROLLER, COMPUTER READABLE STORAGE MEDIUM, AND EVALUATION METHOD

CROSS-REFERENCE TO RELATED APPLICATION

This application claims the priority benefit of Japanese Patent Application 2017-047658, filed on Mar. 13, 2017. The entirety of the above-mentioned patent application is hereby incorporated by reference herein and made a part of this specification.

BACKGROUND

Technical Field

The present disclosure relates to an evaluation system, a safety controller, an evaluation program, and an evaluation method for evaluating functional safety of a safety program.

Description of Related Art

In order to safely use machines that are used in many manufacturing sites, safety equipment (safety components) in accordance with international standards has to be used. This safety equipment is for preventing human safety from being threatened by automatically moving apparatuses such as robots. Such safety equipment includes a safety controller that executes a safety program as well as a detection device that detects the presence or intrusion of persons, an input device that receives operations in an emergency, an output device that actually stops a device, and the like.

As one of such technologies for securing safety in manufacturing sites, Japanese Patent Application Laid-Open No. 2014-137621 (Patent Document 1), for example, discloses a method of supporting design of a user program for a safety controller capable of facilitating the design of a user program for a safety controller.

Japanese Patent Application Laid-Open (JP-A) No. 2014-137621 (Patent Document 1) discloses a configuration in which a safety controller and a safety Input/Output (I/O) terminal are connected via a bus-type network and the safety controller outputs a command for performing a safety operation to a safety output device that is connected to the safety I/O terminal on the basis of an input signal from a safety input device that is connected to the safety I/O terminal.

Patent Documents

[Patent Document 1] Japanese Patent Application Laid-Open No. 2014-137621

Incidentally, it is necessary to confirm that a safety program executed by a safety controller operates as designed in advance. Although Patent Document 1 described above discloses a method of supporting design of a user program for a safety controller capable of facilitating the design of a user program for a safety controller, Patent Document 1 has no instructions regarding a method of inspecting the user program for a safety controller after the design.

Therefore, it is desirable to provide a technology for evaluating the functional safety of a designed safety program.

SUMMARY

According to an aspect of the invention, there is provided an evaluation system that evaluates functional safety for a safety program in order to cause an output device to operate such that safety is maintained if predetermined condition is satisfied, the evaluation system including: a processing execution means for deciding a value of an output signal to be output to one or more corresponding output devices by executing computation in accordance with the safety program, on the basis of an input signal from any of one or more input devices; a setting means for receiving an evaluation condition that includes an input signal of an evaluation target and an expected output value as a value of an output signal to be output to an output device corresponding to a change in a value of the input signal; a first determination means for determining whether or not a first output value of an output signal decided by the processing execution means coincides with the expected output value on the basis of reception of a change in the value of the input signal of the evaluation target from a first input value as an initial value to a second input value from an input device of the evaluation target; a second determination means for determining whether or not a second output value of an output signal decided by the processing execution means coincides with the first output value on the basis of reception of returning of the value of the input signal of the evaluation target from the second input value to the first input value from the input device of the evaluation target; and an output means for outputting determination results of the first determination means and the second determination means in association with the input signal of the evaluation target.

According to another aspect of the invention, there is provided a safety controller that evaluates functional safety for a safety program in order to cause an output device to operate such that safety is maintained if a predetermined condition is satisfied, the safety controller including: a processing execution means for deciding a value of an output signal to be output to one or more corresponding output devices by executing computation in accordance with the safety program, on the basis of an input signal from any of one or more input devices; a setting means for receiving an evaluation condition that includes an input signal of an evaluation target and an expected output value as a value of an output signal to be output to an output device corresponding to a change in a value of the input signal; a first determination means for determining whether or not a first output value of an output signal decided by the processing execution means coincides with the expected output value on the basis of reception of a change in the value of the input signal of the evaluation target from a first input value as an initial value to a second input value from an input device of the evaluation target; a second determination means for determining whether or not a second output value of an output signal decided by the processing execution means coincides with the first output value on the basis of reception of returning of the value of the input signal of the evaluation target from the second input value to the first input value from the input device of the evaluation target; and an output means for outputting determination results of the first determination means and the second determination means in association with the input signal of the evaluation target.

According to another aspect of the invention, there is provided a non-transitory computer readable storage medium that evaluates functional safety for a safety program in order to cause an output device to operate such that safety is maintained if a predetermined condition is satisfied, the non-transitory computer readable storage medium storing a plurality of program instructions, wherein the program instructions are loaded into a computer to execute steps of: deciding a value of an output signal to be output to one or more corresponding output devices by executing computation in accordance with the safety program, on the basis of an input signal from any of one or more input devices; receiving an evaluation condition that includes an input signal of an evaluation target and an expected output value as a value of an output signal to be output to an output device corresponding to a change in a value of the input signal; determining whether or not a first output value of an output signal decided by computation in accordance with the safety program coincides with the expected output value on the basis of reception of a change in the value of the input signal of the evaluation target from a first input value as an initial value to a second input value from an input device of the evaluation target; determining whether or not a second output value of an output signal decided by the computation in accordance with the safety program coincides with the first output value on the basis of reception of returning of the value of the input signal of the evaluation target from the second input value to the first input value from the input device of the evaluation target; and outputting determination results in the determining step in association with the input signal of the evaluation target.

According to another aspect of the invention, there is provided an evaluation method that evaluates functional safety for a safety program in order to cause an output device to operate such that safety is maintained if a predetermined condition is satisfied, the evaluation method including: deciding a value of an output signal to be output to one or more corresponding output devices by executing computation in accordance with the safety program, on the basis of an input signal from any of one or more input devices; receiving an evaluation condition that includes an input signal of an evaluation target and an expected output value as a value of an output signal to be output to an output device corresponding to a change in a value of the input signal; determining whether or not a first output value of an output signal decided by the computation in accordance with the safety program coincides with the expected output value on the basis of reception of a change in the value of the input signal of the evaluation target from a first input value as an initial value to a second input value from an input device of the evaluation target; determining whether or not a second output value of an output signal decided by the computation in accordance with the safety program coincides with the first output value on the basis of reception of returning of the value of the input signal of the evaluation target from the second input value to the first input value from the input device of the evaluation target; and outputting determination results in the determining step in association with the input signal of the evaluation target.

BRIEF DESCRIPTION OF THE DRAWINGS

FIG. 13 is a diagram for explaining processing of setting the expected output values in cooperation with another application in the evaluation system according to the embodiment.

FIG. 14 is a diagram illustrating a screen column of the information processing apparatus according to the embodiment.

FIG. 15 is a diagram illustrating a screen column of the information processing apparatus according to the embodiment.

FIG. 16 is a diagram illustrating a screen column of the information processing apparatus according to the embodiment.

FIG. 17 is a diagram illustrating a screen column of the information processing apparatus according to the embodiment.

FIG. 18 is a diagram illustrating a screen column of the information processing apparatus according to the embodiment.

FIG. 19 is a schematic view illustrating an example of evaluation results of functional safety evaluation that is executed by the evaluation system according to the embodiment.

FIG. 20 is a schematic view illustrating a modification example of evaluation result of the functional safety evaluation that is executed by the evaluation system according to the embodiment.

FIG. 21 is a diagram illustrating a printing example of evaluation results.

DESCRIPTION OF THE EMBODIMENTS

Figure 1:
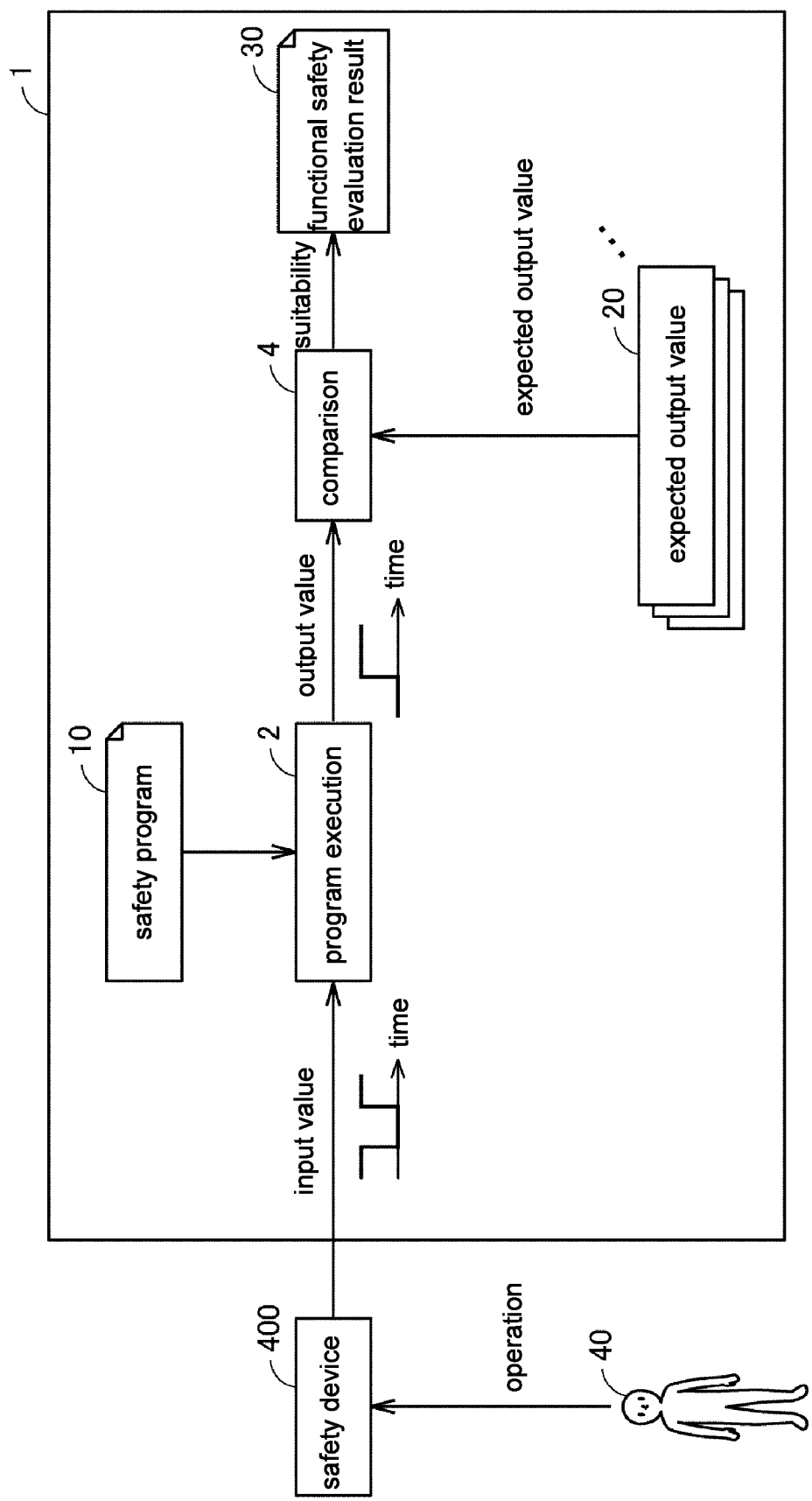
FIG. 1 is a schematic view for explaining an outline of an evaluation system according to an embodiment in terms of functions.

Hereinafter, embodiments of the invention will be described with reference to the drawings. In the following description, the same reference numerals will be given to the same parts and components. The names and the functions thereof are also the same. Therefore, detailed description thereof will not be repeated.

<A. Outline of Evaluation System>

First, an outline of an evaluation system according to an embodiment will be described. The evaluation system has a function of evaluating functional safety for an arbitrary safety program.

In the specification, the "safety program" is a program for causing an output device to operate such that safety is maintained if predetermined conditions (safety conditions) are satisfied, and means a group of commands that define processing of a safety controller. More specifically, the safety program includes a combination of commands for deciding values of one or more output signals for one or more input signals.

The safety program may be any entity as long as the safety program defines processing of the safety controller. That is, the safety program may be present as one or more source codes, may be present as one or more object codes, or may be in the form (execution form) in which the safety program can be executed by a processor of the safety controller.

In addition, the safety program may be described using a function block diagram (FBD). Alternatively, the safety program may be described by any one of or in combination of a ladder diagram (LD), an instruction list (IL), structured text (ST), and a sequential function chart (SFC). In addition or alternatively, the safety program may be described by a general-purpose programming language such as JavaScript (registered trademark) or C language.

Also, the safety program may be created in accordance with the regulations released by the technical committee 5 of PLCopen (registered trademark) that is a third-party organization that has conducted distribution activities for international standards IEC (International Electrotechnical Commission) 61131-3 (JIS (Japanese Industrial Standards) B 3503) of PLC programming and development and qualification of specifications of standard function block diagrams independently of vendors.

The evaluation of the functional safety for the safety program by the safety controller according to the embodiment is for verifying whether or not behaviors based on the target safety program adapt to necessary safety standards. Specifically, each combination of values of variables to be input to the safety program is input, and it is sequentially determined whether or not an output result with respect to the input coincides with an original result. The safety controller can automatically execute an operation of verifying each combination of the input values as described above.

In the following description, a safety program described as a variable program will be exemplified. Therefore, signals (typically, an input signal and an output signal) that are actually exchanged between the safety controller and a safety component or the like are respectively dealt with as "variables" in the safety program. Since these real signals and corresponding variables in the safety program are essentially the same, these may also collectively be referred to as "signals" in the following description. That is, the "signals" described in the specification can include variables referring to values assigned to electrical signals in the safety controller in addition to electrical signals that are exchanged in practice.

FIG. 1 is a schematic view for explaining an outline of an evaluation system 1 according to the embodiment. Referring to FIG. 1, the evaluation system 1 includes a program execution function 2 and a comparison function 4 as main functions thereof.

The program execution function 2 executes computation processing at predetermined intervals or every time an event occurs in accordance with a safety program 10 and outputs the execution results. When the safety program 10 is executed, the program execution function 2 acquires one or more input values from a safety device 400 on the basis of an operation performed by an evaluator 40 on the safety device 400 that is an input device. Typically, a plurality of types of the safety device 400 are connected to the evaluation system 1. The safety device 400 includes a detection device that detects the presence or intrusion of persons, an input device that receives operations in an emergency, and an output device that actually stops a device, for example. Evaluation conditions 20 that include combinations of input values and expected output values corresponding to the input values are prepared in advance, and a safety device 400 to be operated is presented to the evaluator 40 on the basis of the evaluation conditions 20. Alternatively, the safety device 400 is operated by the evaluator 40 in a random order. The program execution function 2 executes logical computation or the like on the basis of acquired input values in response to an operation performed by the evaluator 40 on the safety device 400.

The comparison function 4 compares an output value that is output when an input value based on the evaluation conditions 20 is input to the program execution function 2 with an expected output value corresponding to the input value under the evaluation conditions 20. In a case in which both values coincide with each other, it is determined that a primary safety operation is healthy.

The evaluation conditions 20 contain an input value and an expected output value corresponding to the input value and also contain conditions for a restoration operation. In the functional safety evaluation according to the embodiment, an input value previously input is changed or maintained in accordance with the set conditions for the restoration operation. Then, it is also determined whether or not a change or maintenance of the output value that accompanies a change or maintenance of the input value is adapted to conditions for the restoration operation set in advance.

As described above, it is evaluated whether to maintain a stopped state or perform restoration from the stopped state or the like to an ordinary operating state (secondary evaluation of a safety operation) when an input value that serves as a trigger for a safety operation is restored to an original value, in addition to the evaluation of whether or not a necessary safety operation is to be executed (evaluation of the primary safety operation), by providing the input value that serves as the trigger for the safety operation from the safety device 400 in the embodiment. In addition, it is determined whether or not a behavior conforms to conditions for a restoration operation set in advance in the secondary evaluation of the safety operation.

The evaluation result described above may be output on a screen or on paper as functional safety evaluation result 30.

<B. System Configuration of Evaluation System 1>

Figure 2:
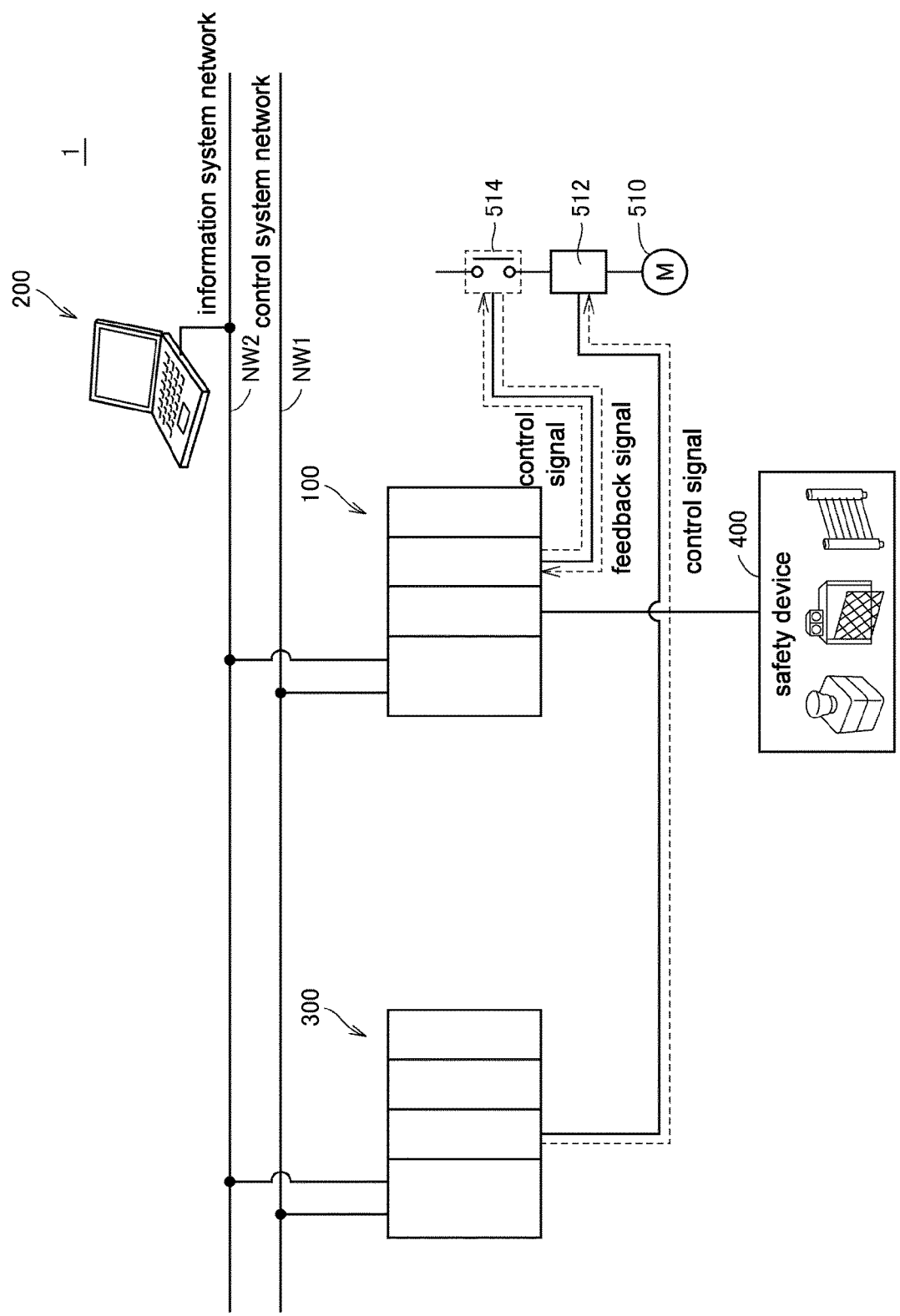
FIG. 2 is a diagram illustrating an example of a system configuration of the evaluation system according to the embodiment.

Next, a system configuration of the evaluation system 1 according to the embodiment will be described. FIG. 2 is a diagram illustrating an example of the system configuration of the evaluation system 1.

Referring to FIG. 2, the evaluation system 1 mainly includes a safety controller 100, an information processing apparatus 200, and a control apparatus 300 that controls equipment, machines, and the like.

The control apparatus 300 typically includes a programmable controller (PLC) or the like, executes a user program defined in advance in relation to input data acquired from a control target, and provides a command to the control target in accordance with output data calculated therefrom. As the control target illustrated in FIG. 2, a motor 510 and a driver 512 that drives the motor 510 will be exemplified. The control apparatus 300 outputs a drive command to the driver 512 in order to rotate and drive the motor 510 if specific drive start condition is satisfied, in accordance with the user program. In addition, the control apparatus 300 stops the output of the drive command to the driver 512 in order to stop the rotation and the driving of the motor 510 if specific drive stop condition is satisfied.

In addition to such control of the control target by the control apparatus 300, the safety controller 100 is also present in order to secure safety of an operator or the like in association with the control target. The safety controller 100 carries out a safety operation if conditions (safety conditions) defined in advance in association with an input signal and the like from the safety device 400 (a safety sensor, a safety door switch, a safety limit switch, an emergency stop switch, a safety switch, and the like) that serves as input devices are satisfied.

In the example illustrated in FIG. 2, a safety relay 514 as an example of an output device is present on a power supply line to the driver 512. The output device described herein means a device that is driven in response to operations performed on the safety device 400. The safety relay 514 drives a contactor that blocks an electric path, for example. In addition, a hazard area is set in the vicinity of an apparatus driven by the motor 510, and the safety device 400 is present in the vicinity of the hazard area. The safety device 400 includes a detection device that detects the presence or intrusion of persons and an input device that receives operations in an emergency, for example. The safety relay 514 is driven by receiving the input signals from the safety device 400.

In one example, the safety controller 100 outputs a control signal to the safety relay 514 in response to a stop signal from an emergency stop switch if a safety device 400 that serves as an emergency stop switch receives an emergency stop operation from an operator. The safety relay 514 operates in response to the control signal from the safety controller 100 and blocks power supply to the driver 512 that drives the motor 510. As a result, the motor 510 is forcibly stopped. It is possible to secure safety of the operator by such forced stopping of the motor 510.

In another example, a safety device 400 that serves as a safety sensor detects that an operator has entered a hazard area. If the operator enters the hazard area, the safety sensor detects the entrance of the operator. The safety controller 100 outputs a control signal to the safety relay 514 in response to a detection signal from the safety sensor. The safety relay 514 operates in response to the control signal from the safety controller 100 and blocks power supply to the driver 512 that drives the motor 510. As a result, the motor 510 is forcibly stopped. It is possible to secure safety of the operator who has entered the hazard area by such forced stopping of the motor 510.

In the configuration example illustrated in FIG. 2, the safety controller 100 and the control apparatus 300 are connected via a control system network NW1 and the data that is internally held by both the safety controller 100 and the control apparatus 300 can be mutually exchanged. In addition, the safety controller 100 and the control apparatus 300 are connected to the information processing apparatus 200 via an information system network NW2.

The information processing apparatus 200 is a support tool for providing functions of developing a program that is executed by the safety controller 100 or the control apparatus 300, checking a program execution state, changing the program, and the like. The information processing apparatus 200 is a personal computer (PC), a tablet terminal, a smartphone, or another communication terminal, for example.

<C. Apparatus Configurations>

Next, apparatus configurations of the respective apparatuses that are included in the evaluation system 1 according to the embodiment will be described.

(c1: Safety Controller 100)

Figure 3:
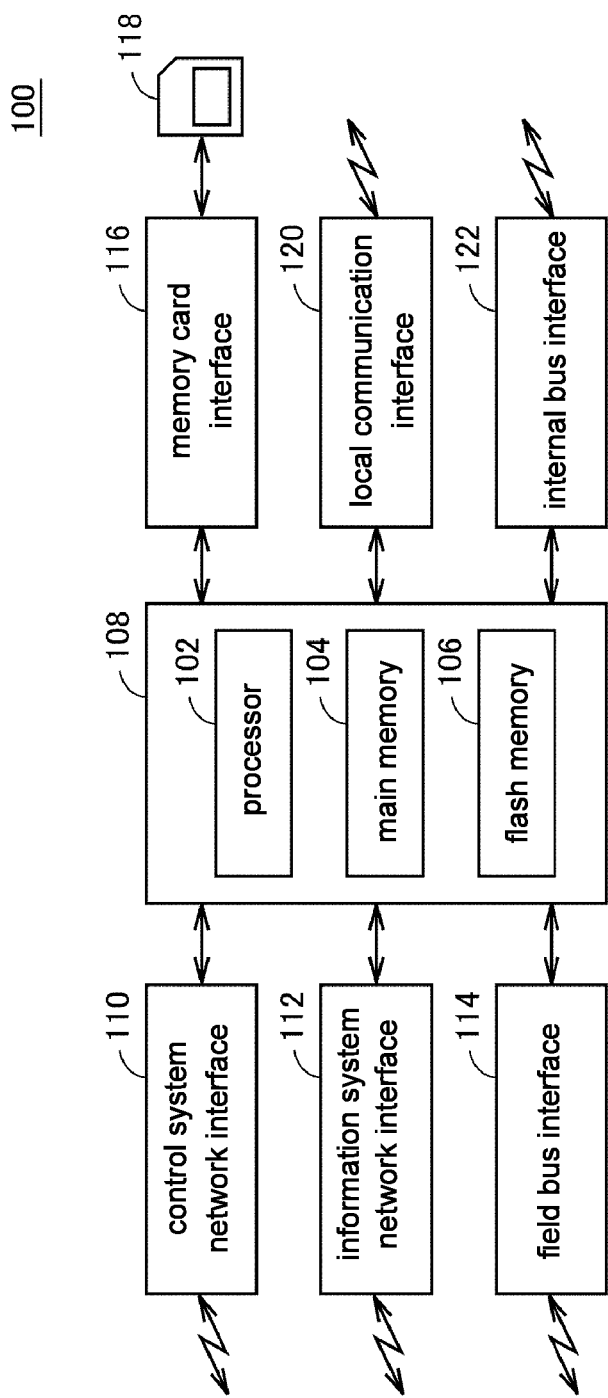
FIG. 3 is a schematic view illustrating an example of an apparatus configuration of a safety controller according to the embodiment.

FIG. 3 is a schematic view illustrating an example of an apparatus configuration of the safety controller 100 according to the embodiment. Referring to FIG. 3, the safety controller 100 includes a computation processing unit 108 including a processor 102, a main memory 104, and a flash memory 106, and various interfaces.

In the computation processing unit 108, the processor 102 realizes functional safety in accordance with a control target by expanding and executing, in the main memory 104, a system program, a safety program, and the like that are stored in the flash memory 106.

The safety controller 100 includes, as interfaces, a control system network interface 110, an information system network interface 112, a field bus interface 114, a memory card interface 116, a local communication interface 120, and an internal bus interface 122.

The control system network interface 110 mediates communication with another apparatus via the control system network NW1 (see FIG. 2). As the control system network NW1, a network protocol that guarantees punctuality, such as EtherCAT (registered trademark), for example, may be employed.

The information system network interface 112 mediates communication with another apparatus via the information system network NW2 (see FIG. 2). As the information system network NW2, a network protocol that guarantees punctuality, such as EtherNet/IP (registered trademark), for example, may be employed.

The field bus interface 114 mediates communication with an input/output unit that is connected via a field bus, which is not illustrated. As the field bus, a network protocol that guarantees punctuality, such as EtherCAT (registered trademark), EtherNet/IP (registered trademark), DeviceNet (registered trademark), or CompoNet (registered trademark), may be employed.

The memory card interface 116 is designed such that a memory card 118 can be inserted thereinto, reads data from the memory card 118, and writes data into the memory card 118.

The local communication interface 120 is an interface that directly connects to the information processing apparatus 200 or another apparatus, and for example, a universal serial bus (USB) or the like is used.

The internal bus interface 122 mediates communication with an input/output unit that is directly attached to the safety controller 100 via an internal bus.

(c2: Information Processing Apparatus 200)

Figure 4:
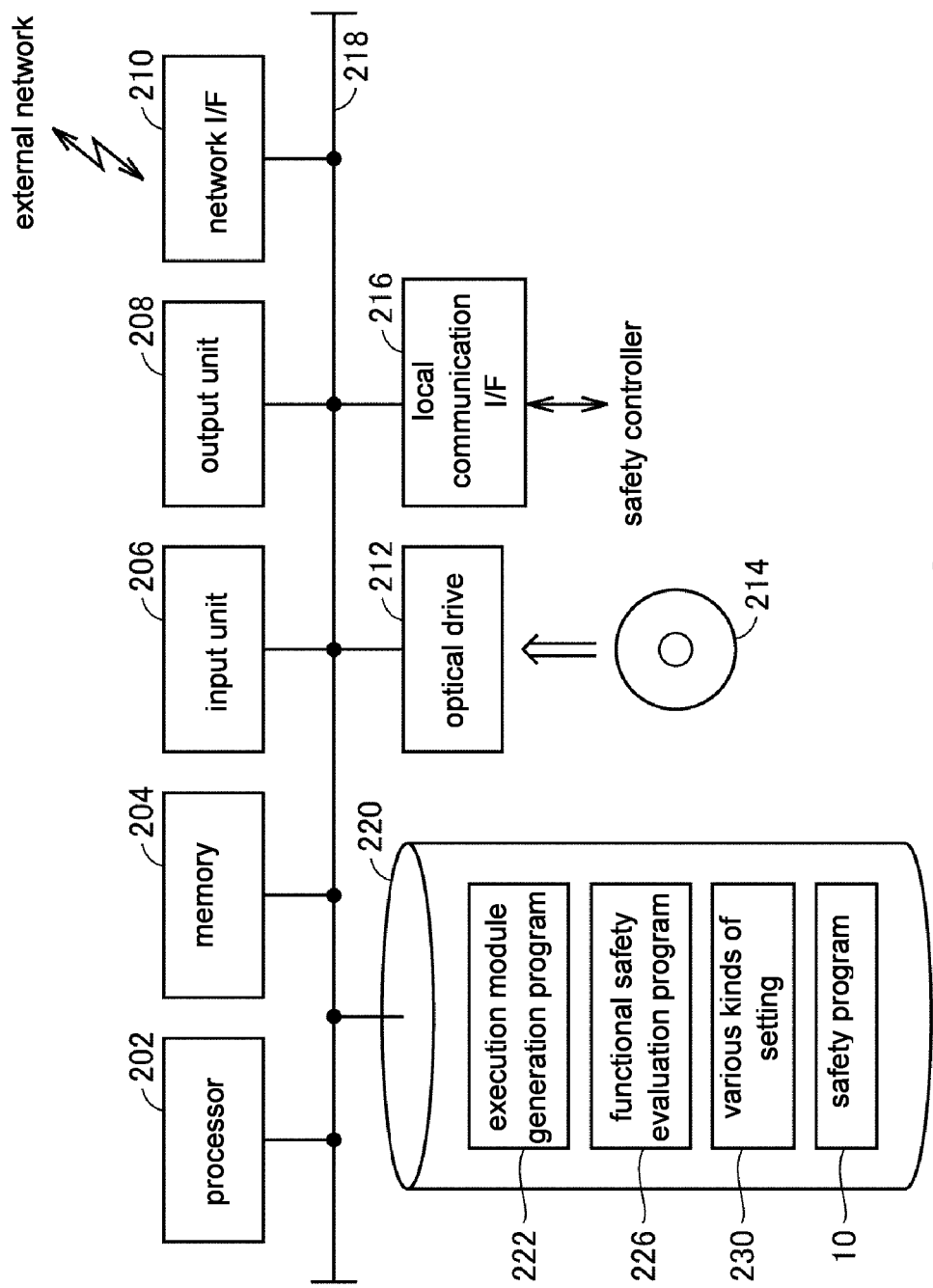
FIG. 4 is a schematic view illustrating an example of a hardware configuration of an information processing apparatus according to the embodiment.

Next, a hardware configuration of the information processing apparatus 200 will be exemplified. FIG. 4 is a schematic view illustrating an example of a hardware configuration of the information processing apparatus 200 according to the embodiment.

The information processing apparatus 200 may be a mobile terminal such as a notebook PC, a tablet terminal, or a smartphone or may be a non-mobile terminal such as a desktop PC.

The information processing apparatus 200 includes, as main components, a processor 202 that executes an operating system (OS) and various programs, which will be described later, a memory 204 that provides a working area for storing data necessary for executing a program by the processor 202, an input unit 206 that receives a user's operation through a keyboard, a mouse, or the like, an output unit 208 that outputs a processing result, such as a display, various indicators, or a printer, a network interface (I/F) 210 that establishes communication with an external network, an optical drive 212, a local communication interface (I/F) 216 that establishes communication with the safety controller or the like, and an auxiliary storage device 220. These components are connected via an internal bus 218 or the like such that data can be communicated.

The information processing apparatus 200 has an optical drive 212, reads various programs from a computer readable recording medium 214 such as an optical recording medium (for example, a digital versatile disc (DVD)) that non-temporarily stores a computer readable program, and installs the various programs in the auxiliary storage device 220 or the like. Processing related to the functional safety evaluation according to the embodiment may be provided as a part of a development environment program that provides functions, such as setting, programming, and debugging, to the safety controller.

The various programs that are executed by the information processing apparatus 200 may be installed via the computer readable recording medium 214 or may be installed in a manner of being downloaded from a server device on a network. In addition, a program related to the functional safety evaluation according to the embodiment may be realized in the form of utilizing a part of modules provided by the OS. In such a case, not all the software modules necessary for realizing the functional safety evaluation according to the embodiment may be distributed, and a part thereof may be distributed. It is clear that such a case is also included in the technical scope of the invention. The processing related to the functional safety evaluation according to the embodiment may be implemented by a part of another program or software.

The auxiliary storage device 220 includes a hard disk drive (HDD), and a flash solid state drive (SSD), for example, and stores programs that are executed by the processor 202. Specifically, the auxiliary storage device 220 includes, as programs that provide processing which will be described later, an execution module generation program 222 for generating codes (execution modules) that can be executed by the processor 202 from a safety program (source program), an emulator program 224 for executing a safety program (execution module) by simulating the safety controller, and a functional safety evaluation program 226 for evaluating the functional safety which will be described later. Functions and processing that are provided by these programs will be described later.

In addition, the auxiliary storage device 220 stores the safety program 10 and settings 230 of various kinds as evaluation targets for functional safety.

Although the functional safety evaluation of the safety program according to the embodiment is realized by a general-purpose computer executing the program in FIG. 4, an entirety or a part thereof may be implemented by a hard wired circuit instead of such a configuration. For example, functions provided by the processor 202 executing the aforementioned various programs may be implemented using an application specific integrated circuit (ASIC) or a field-programmable gate array (FPGA).

(c3: Control Apparatus 300)

Since a control apparatus 300 according to the embodiment has the same apparatus configuration as that of the safety controller 100 illustrated in FIG. 3, detailed description thereof is not repeated. In addition, although the safety controller 100 employs duplication of processors and the like and the safety module, the control apparatus 300 generally does not employ such a configuration. In addition, the control apparatus 300 executes a user program instead of the aforementioned safety program.

<D. Software Configuration of Evaluation System>

Figure 5:
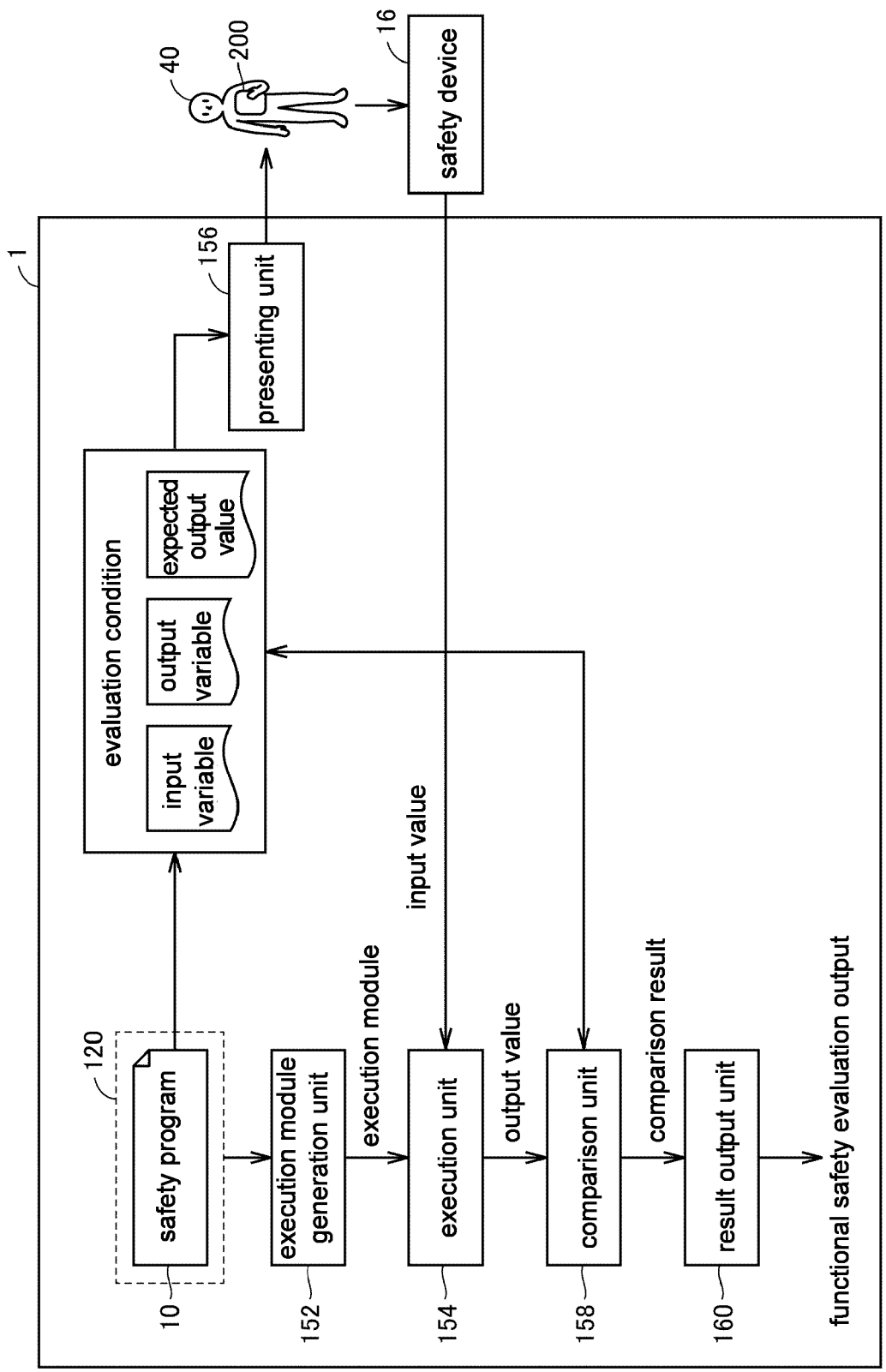
FIG. 5 is a schematic diagram illustrating an example of a software configuration of the evaluation system according to the embodiment.

Next, a software configuration of the evaluation system 1 will be exemplified. FIG. 5 is a schematic view illustrating an example of the software configuration of the evaluation system 1 according to the embodiment. Referring to FIG. 5, the evaluation system 1 includes, as software components thereof, an execution module generation unit 152, an execution unit 154, a presenting unit 156, a comparison unit 158, and a result output unit 160.

The execution module generation unit 152 is realized by the processor 102 executing the execution module generation program 222 (see FIG. 4) and generates an execution module from the safety program 10. The execution module generation unit 152 typically includes functions of a compiler, an assembler, a linker, and the like.

The execution unit 154 executes the execution program generated by the execution module generation unit 152.

The presenting unit 156 causes the information processing apparatus 200 to present details of an instruction for the safety device 400 as an evaluation target in accordance with evaluation conditions prepared in advance. A mobile terminal such as a notebook PC, a tablet terminal, or a smartphone may be employed as the information processing apparatus 200, and the evaluator 40 can check the content of the instruction received from the presenting unit 156 while carrying the information processing apparatus 200. The evaluator 40 operates the safety device 400 in accordance with the content of the instruction displayed on the information processing apparatus 200. The content of the instruction, for example, includes an ON/OFF operation of the emergency stop switch, an instruction about entrance to an area detected by the safety sensor, and the like. The safety device 400 provides an input value in response to an operation by the evaluator 40 to the execution unit 154. The comparison unit 158 compares an output value calculated by providing an input value for evaluating functional safety to the execution unit 154 with an expected output value corresponding to the input value, and outputs the comparison result. There are a plurality of types of comparison processing as will be described later. The results output unit 160 outputs the comparison result from the comparison unit 158 as a functional safety evaluation output.

As described above, the evaluation system 1 has a processing execution function of deciding values of one or more corresponding output signals by executing computation in accordance with the safety program 10 on the basis of one or more input signals, and the processing execution function can be realized in an environment in which the safety program 10 can be actually or virtually executed.

<E. Example of Realizing Functional Configuration>

Figure 6A:
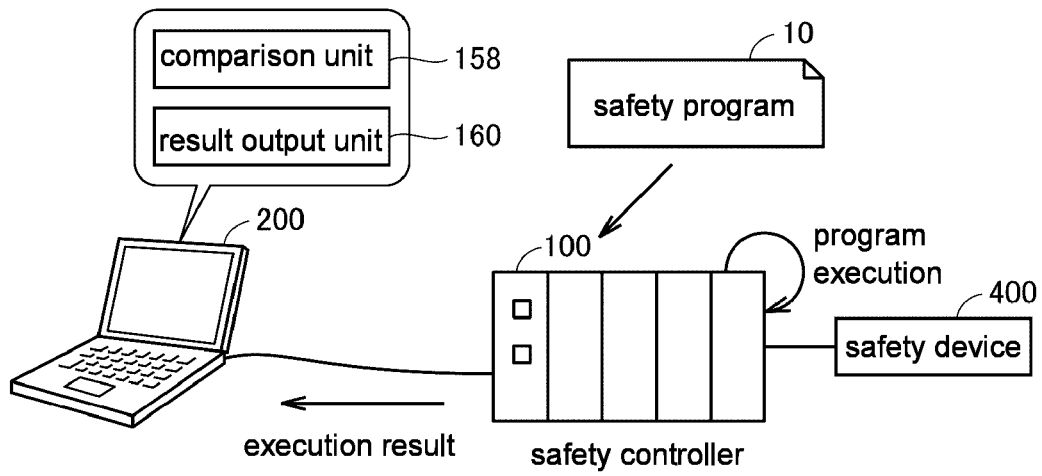
FIGS. 6(A) and 6(B) are diagrams illustrating examples of realizing a functional configuration in the evaluation system according to the embodiment.
Figure 6B:
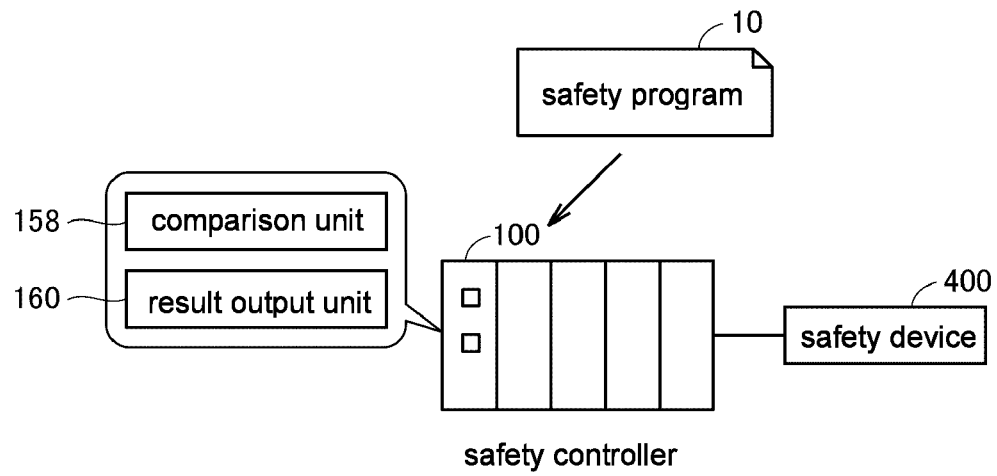

FIGS. 6(A) and 6(B) are diagrams illustrating examples of realizing a functional configuration. FIG. 6(A) illustrates an example in which the evaluation system is realized by the safety controller 100 and the information processing apparatus 200, and FIG. 6(B) illustrates an example in which the evaluation system is realized only by the safety controller 100.

In a case in which the evaluation system is realized by the safety controller 100 and the information processing apparatus 200 as illustrated in FIG. 6(A), the safety controller 100 and the information processing apparatus 200 are connected such that data can be exchanged therebetween. Further, the comparison unit 158 and the results output unit 160 are mounted on the information processing apparatus 200, and the target safety program 10 is executed on the safety controller.

Corresponding to this, in a case in which the evaluation system is realized only by the safety controller 100, the comparison unit 158 and the results output unit 160 are mounted on the safety controller 100. As described above, various functions according to the embodiment can be executed in various forms.

<F. Safety Program>

Next, an example of the safety program that is a target of the evaluation system 1 according to the embodiment will be described. In the embodiment, an example in which description is made using a function block diagram (FBD) in accordance with the international standards IEC 61131-3 (JIS B 3503) will be illustrated as an example.

Figure 7:
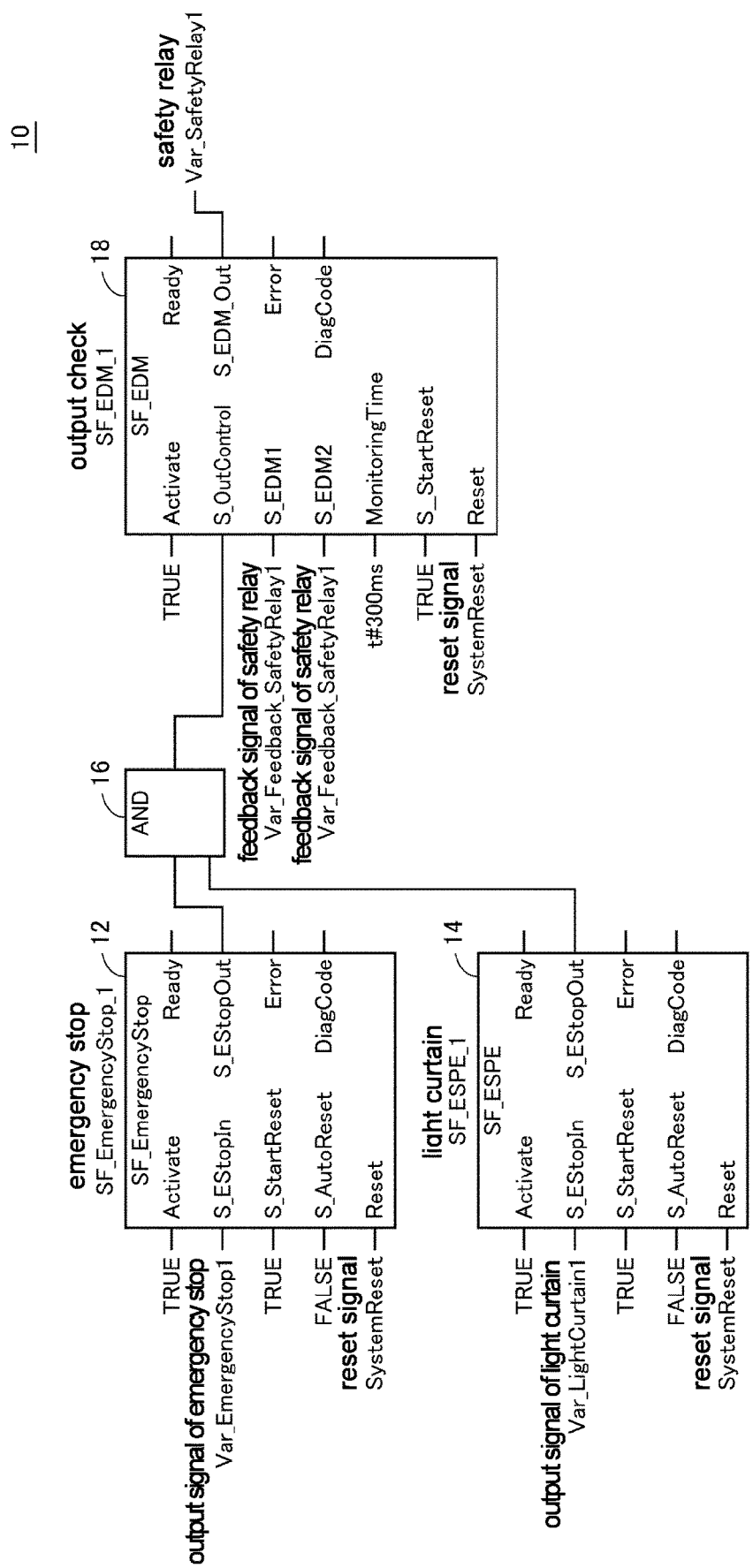
FIG. 7 is a schematic view illustrating an example of a safety program that is a target of the evaluation system according to the embodiment.

FIG. 7 is a schematic view illustrating an example of the safety program 10 that is a target of the evaluation system 1 according to the embodiment. The safety program 10 illustrated in FIG. 7 typically assumes a facility in which some type of robot is present, a hazard area around the robot is surrounded by a safety fence, and persons can enter or exit the hazard area from a part of the safety fence. The part from which persons can enter or exit the hazard area is provided with a light curtain, and an emergency stop button capable of causing emergency stop of the robot when an unexpected situation occurs.

The safety program 10 illustrated in FIG. 7 includes two emergency stop function blocks (hereinafter, also referred to as "emergency stop FB") 12 and 14, an output check function block (hereinafter, also referred to as an "output FB") 18, and an AND block 16 that connects both the function blocks. The emergency stop FB 12 is logic for processing of an input signal from the emergency stop button, and the emergency stop FB 14 is logic for processing of an input signal from the light curtain.

Regarding the safety program 10 that is a target of the evaluation system 1 according to the embodiment, the program is described by variable programming. That is, each of signals output from the emergency stop button and the light curtain is assigned to a unique internal variable in accordance with settings defined in advance. In the safety program 10, an intended operation is realized by logically associating an appropriate internal variable with an input or an output for each function block.

Each of the emergency stop FBs 12 and 14 has a total of five inputs, namely, "Activate" for setting valid/invalid for processing of the function blocks, "S_EStopin" to which a signal output from the input device related to the emergency stop is input, "S_StartReset" to which a signal for setting whether or not to start execution of a program after reset is input, "S-AutoReset" to which a signal for setting a reset type after the safety operation is input, and "Reset" to which a signal for resetting the operation after the safety operation is input.

In addition, each of the emergency stop FBs 12 and 14 has a total of four outputs, namely, "Ready" for outputting a signal indicating whether or not the function block is in an operating state, "S_EStopOut" for outputting a signal for providing an instruction for a safety operation, "Error" for outputting a signal indicating occurrence of some type of error, and "DiagCode" for outputting a code corresponding content of the error that has occurred, as outputs thereof.

In the safety program 10 according to the embodiment, an input value and an output value at a normal time are assumed to be "TRUE" ("1" or "true"). That is, in a case in which a safety operation is performed under certain conditions, the output value becomes "FALSE" due to the input value as a trigger of the safety operation changing to "FALSE ("0" or "false")", and the target apparatus performs the safety operation on the basis of the output value of "FALSE".

For "TRUE" set as initial values of the input signal and the output signal, a value that is different from a value (that is, "FALSE") indicated in the same memory state as that when a supply of power to be provided for the safety controller that executes the safety program 10 has been lost is used. That is, so-called fail safe in which a safety operation is performed after malfunction of hardware or the like can be realized by using a value that is different from a value indicated in a state in which electric charge or the like is not kept in a non-volatile memory of the safety controller.

The values assigned to the input value and the output value at the normal time and the emergency time are design matters, and any values may be designed. However, the input value and the output value at the normal time may be set to "TRUE" from the viewpoint of the aforementioned fail safe.

In the safety program 10 illustrated in FIG. 7, a variable "Var_EmergencyStop1" indicating a signal output from the emergency stop button is assigned to the input "S_EStopIn" of the emergency stop FB 12, and a variable "SystemReset" indicating system reset for the safety controller is assigned to the input "Reset".

A variable "Var_LightCurtain1" indicating a signal output from the light curtain is assigned to the input "S_EStopIn" of the emergency stop FB 14, and a variable "SystemReset" indicating system reset for the safety controller is assigned to the input "Reset".

"TRUE", that is, valid processing is set for "Activate" of both the emergency stop FBs 12 and 14, "TRUE", that is, program execution after reset is set for "S_StartReset" thereof, and "FALSE", that is, "manual reset" as a reset type is set for "S_AutoReset" thereof.

The output value of "S_EStopOut" of each of the emergency stop FBs 12 and 14 basically changes to "FALSE" if the variable input to "S_EStopIn" becomes "FALSE". After such a safety operation, the output value of "S_EStopOut" is reset or maintained in accordance with the value of the variable input to "S_EStopIn" and/or the value of the variable input to "Reset" depending on the set reset type.

"S_EStopOut" from each of the emergency stop FB 12 and the emergency stop FB 14 is input to the AND block 16, and a logical AND thereof is input to the output check FB 18.

The output check FB 18 is a logic for checking whether a safety component that manages the safety operation is functioning as instructed. The output check FB 18 has a total of seven inputs, namely, "Activate" for setting valid/invalid for processing of the function block, "S_OutControl" to which a signal indicating an operation command of a safety component is input, "S_EDM1" and "S_EDM2" to which a signal indicating a state value of the safety component is input, "MonitoringTime" to which a value indicating a health monitoring cycle, "S_StartReset" to which a signal of setting whether or not execution of the program after reset is input, and "Reset" to which a signal for resetting operation after the safety operation is input, as inputs thereof.

In addition, the output check FB 18 has a total of four outputs, namely, "Ready" for outputting a signal indicating whether or not the function block is in an operating state, "S_EDM_Out" for outputting a final signal for indicating a safety operation for the safety component, "Error" for outputting a signal indicating occurrence of some type of error, and "DiagCode" for outputting a code corresponding to content of the error that has occurred, as outputs thereof.

The output check FB 18 changes the command value to be provided to the target safety component from "S_EDM_Out" in accordance with the input value to "S_OutControl" and also determines whether or not the state value of the safety component coincides with the command value. In this manner, it is possible to detect problems such as immovability due to disconnection of a safety relay and constant operations due to welding or the like, for example.

Although an example of simple logics for safety program 10 illustrated in FIG. 7 has been described, more input signals may be provided, and command values may be provided to more safety components.

<G. Reset Types>

Next, reset types set for the emergency stop FB included in the safety program 10 illustrated in FIG. 7 will be described. As described above, "automatic reset" and "manual reset" can be selectively set for the emergency stop FB in one example.

"Automatic reset" is suitable for a case in which the safety operation is performed only when the input signal from the safety component such as a light curtain is "FALSE", for example. It is possible to use the "automatic reset" for a situation in which the apparatus is stopped only when a person has entered a hazard area and the apparatus is made to operate in other states, for example. By setting such "automatic reset", it is possible to reduce an influence on a tact time while securing safety for the operator.

"Manual reset" is a general reset type and is suitable for a case in which it is necessary to perform a predetermined restoration operation for resetting after the safety operation is performed by a safety component such as an emergency stop button being operated. In a case in which the apparatus is stopped in the course of an operation by the emergency stop button being operated, for example, the apparatus may be reset after the apparatus is returned to an initial position.

As described above, the reset types include the "automatic reset" (first type) indicating that an output value of a corresponding output signal is returned to an original value in conjunction with restoration of a value of an input value from "FALSE" (second input value) to "TRUE" (first input value) and "manual reset" (second type) indicating that the output value of the output signal is not returned to the original value until reset conditions defined in advance are satisfied.

Figure 8A:
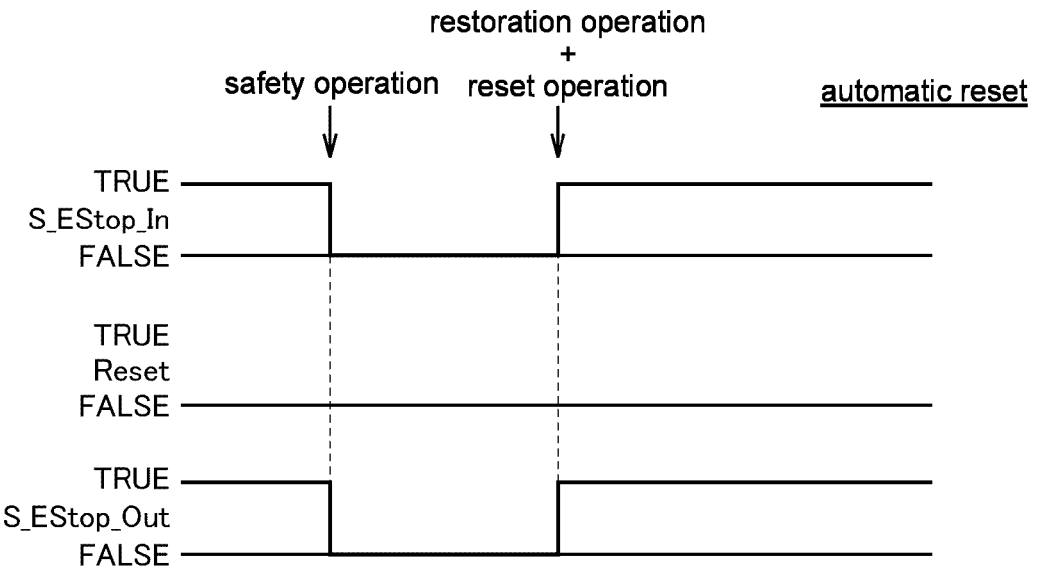
FIGS. 8(A) and 8(B) are diagrams for explaining reset types that are set to emergency stop function blocks included in the safety program according to the embodiment.
Figure 8B:
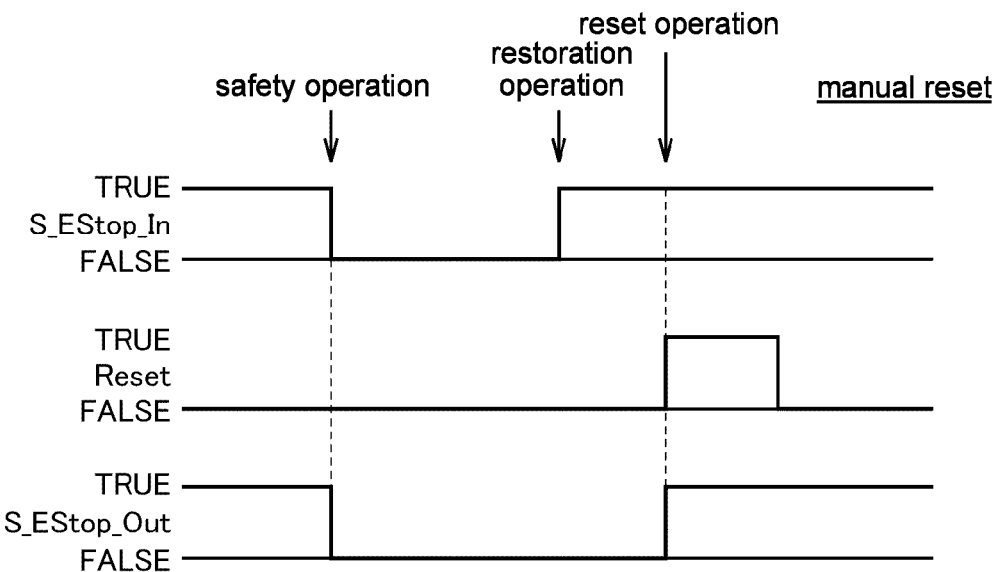

FIGS. 8(A) and 8(B) are diagrams for explaining reset types that are set to emergency stop function blocks included in the safety program 10 according to the embodiment.

FIG. 8(A) illustrates a case in which the "automatic reset" is set as a reset type, and FIG. 8(B) illustrates a case in which the "manual reset" is set as a reset type.

In the "automatic reset" illustrated in FIG. 8A, the output "S_EStopOut" of the emergency stop FB changes from "TRUE" to "FALSE" if the input "S_EStopin" of the emergency stop FB changes from "TRUE" to "FALSE". The safety operation is performed by the change of "S_EStopOut". Thereafter, if the input "S_EStopin" of the emergency stop FB is restored from "FALSE" to "TRUE", a resetting operation is executed together therewith. That is, the output "S_EStopOut" of the emergency stop FB is also changed in conjunction with the input "S_EStopin" of the emergency stop FB.

The evaluation system 1 according to the embodiment checks that the value of the output variables for which the "automatic reset" has been set changes in conjunction with the change in the value of the corresponding input variable.

In the "manual reset" illustrated in FIG. 8(B), the output "S_EStopOut" of the emergency stop FB is maintained to be "FALSE" even if the input "S_EStopin" of the emergency stop FB is restored from "FALSE" to "TRUE" after the input "S_EStopin" of the emergency stop FB changes from "TRUE" to "FALSE" and the output "S_EStopOut" of the emergency stop FB changes from "TRUE" to "FALSE". By changing the input "Reset' of the emergency stop FB from "FALSE" to "TRUE" in this state, first the output "S_EStopOut" of the emergency stop FB changes from "FALSE" to "TRUE".

The evaluation system 1 according to the embodiment confirms that a value of an output variable, for which the "manual reset" has been set, even if a value of a corresponding input variable has changed after the execution of the safety operation, is maintained after such a change, and confirms that the value is reset to an initial value when a variable related to the reset is input.

<H. Overall Procedure for Functional Safety Evaluation>

Next, an overall procedure for the functional safety evaluation provided by the evaluation system 1 according to the embodiment will be described.

Figure 9:
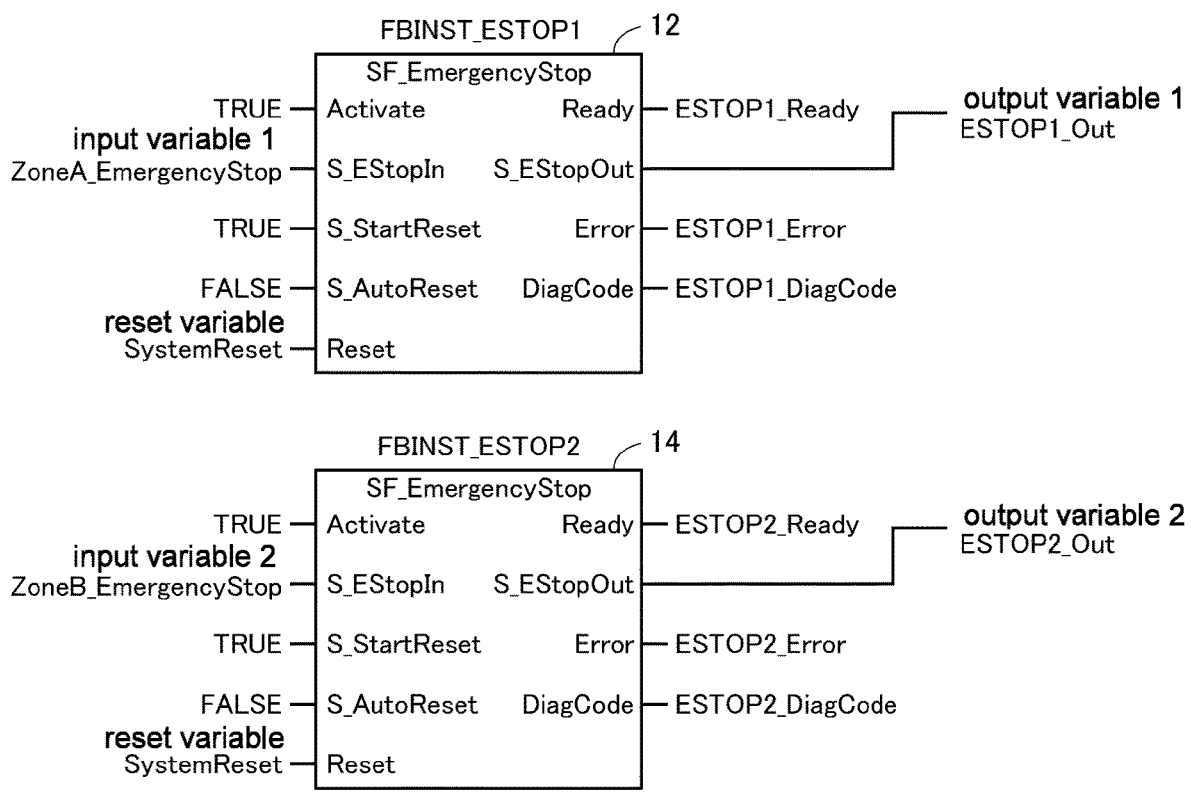
FIG. 9 is a schematic view illustrating another example of the safety program that is a target of the evaluation system according to the embodiment.
Figure 10A:
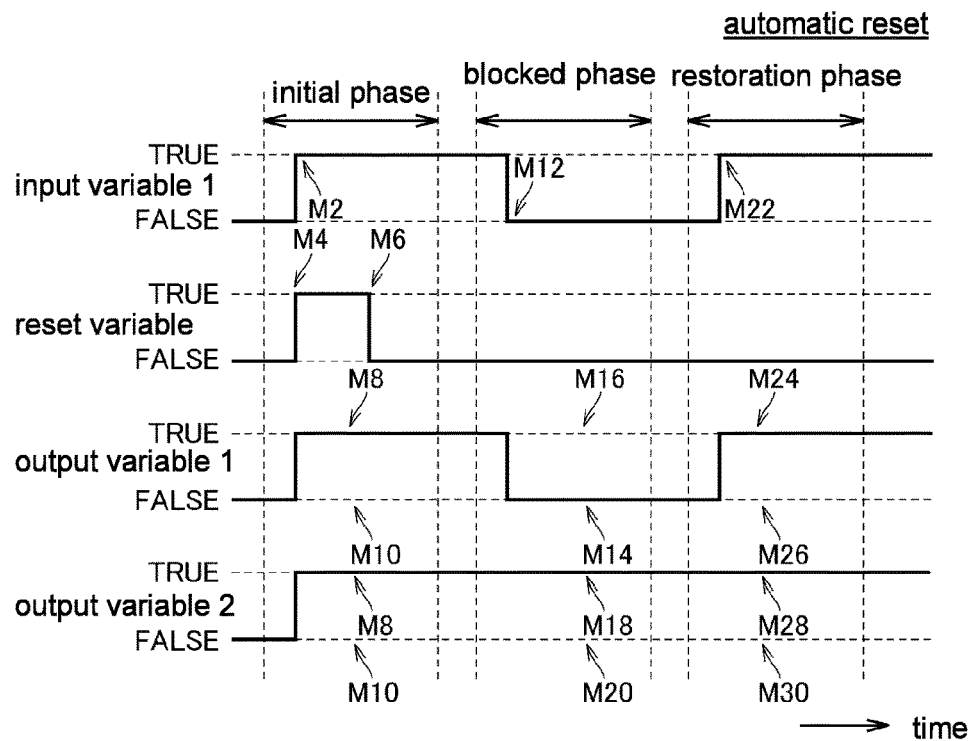
FIGS. 10(A) and 10(B) are time charts for explaining examples of a procedure for functional safety evaluation according to the embodiment.
Figure 10B:
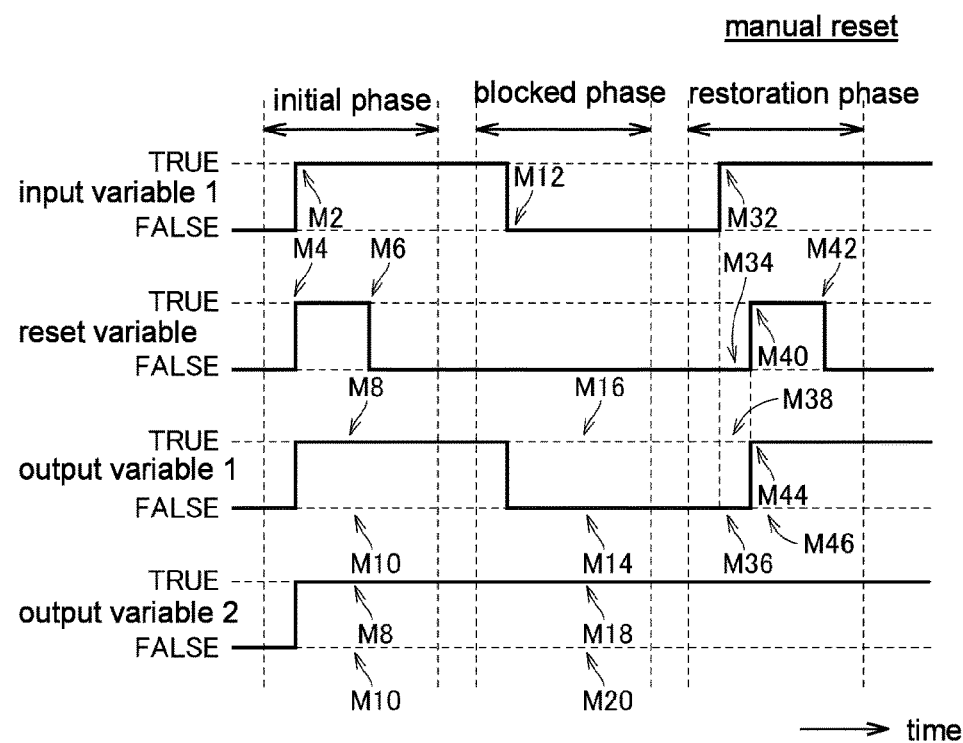

FIG. 9 is a schematic view illustrating another example of the safety program 10 which is a target of the evaluation system 1. FIGS. 10(A) and 10(B) are time charts for explaining examples of a procedure for the functional safety evaluation according to the embodiment. FIGS. 10(A) and 10(B) illustrate procedures in a case in which the functional safety evaluation is applied to the safety program 10 illustrated in FIG. 9 as a target, in a chronological order. In the safety program 10 illustrated in FIG. 9, a variable input to "S_EStopIn" of the emergency stop FB 12 is assumed to be an "input variable 1", a variable input to "S_EStopIn" of the emergency stop FB 14 is assumed to be an "input variable 2", a variable commonly input to "Reset" of the emergency stop FBs 12 and 14 is assumed to be a "reset variable", and a variable output from "S_EStopOut" of the emergency stop FB 12 is assumed to be an "output variable 1". In addition, a variable output from "S_EStopOut" of the emergency stop FB 14 is not illustrated in FIGS. 10(A) and 10(B).

FIG. 10(A) illustrates an example in which the "automatic reset" is set for the output variable, and FIG. 10(B) illustrates an example in which the "manual reset" is set for the output variable.

The functional safety evaluation according to the embodiment typically includes three phases (an initialization phase, a blocked phase, and a restoration phase). In the initialization phase, it is confirmed that the output variable is in an appropriate initial state when all the input variables are set to an initial value set in advance. In the blocked phase, it is confirmed that a corresponding output variable has been changed to an appropriate value and/or the corresponding output variable has not been changed when the input variables are changed to a value indicating the safety operation by an operation performed by an evaluator on the safety device 400. In the restoration phase, it is confirmed that the reset is performed with a set reset type when the input variables and/or reset variables have been changed to a value indicating the reset operation by an operation performed by the evaluator on the safety device 400.

In the procedure for the functional safety evaluation illustrated in FIGS. 10(A) and 10(B), the output variable 1 is a variable for which "TRUE" is set as an expected value and is scheduled to change in conjunction with the input variable 1. Meanwhile, the output variable 2 is a variable for which "FALSE" is set as an expected value and is scheduled not to change in conjunction with the input variable 1. Determination processing described below is executed by the comparison function 4 illustrated in FIG. 1 and the comparison unit 158 illustrated in FIG. 5.

First, a procedure for the functional safety evaluation in a case in which the "automatic rest" is set as a reset type will be described with reference to FIG. 10(A).

In the initialization phase, the value of the input signal of the evaluation target is set to the initial value (first input value), and also, it is determined whether or not a value (fourth output value) of the output signal of the evaluation target decided by the computation processing in accordance with the safety program 10 coincides with the initial value.

Specifically, all the input variables registered are set to "TRUE" (symbol M2). Also, the reset variables are once set to "TRUE" (symbol M4) and are then set to "FALSE" (symbol M6). Corresponding to the change, it is confirmed that all the output variables registered are "TRUE" (symbol M8). If any of the output variables is "FALSE", it is determined that some type of abnormality has occurred (symbol M10).

In the subsequent blocked phase, the value of the input signal of the evaluation target is changed from the initial value "TRUE" (first input value) to "FALSE" (second input value) on the basis of an operation performed by the evaluator on the safety device 400, and also it is determined whether or not the value (first output value) of the output signal of the evaluation target that is decided by the computation processing in accordance with the safety program 10 coincides with the corresponding expected output value.

Specifically, the input variable 1 changes from "TRUE" to "FALSE" on the basis of an operation performed by the evaluator on the safety device 400 (symbol M12). Corresponding to the change, it is confirmed that the output variable 1 for which an expected value setting has been checked (scheduled to be linked to the input variable 1) is "FALSE" (symbol M14). If the output variable 1 is "TRUE", linking with the input variable 1 has not been established, and it is determined that some type of abnormality has occurred (symbol M16). Meanwhile, it is determined that the output variable 2 for which the expected value setting has not been checked (scheduled not to be linked to the input variable 1) is "TRUE" (symbol M18). If the output variable 2 is "FALSE", linking with the input variable 1 has been established, and it is determined that some type of abnormality has occurred (symbol M20).

In the final restoration phase, the value of the input signal of the evaluation target is restored from "FALSE" (second input value) to "TRUE" (first input value) on the basis of an operation performed by the evaluator on the safety device 400, and it is determined whether or not the value (second output value) of the output signal of the evaluation target determined by the computation processing in accordance with the safety program 10 coincides with the value (first output value) in the blocked phase.

Specifically, the input variable 1 changes from "FALSE" to "TRUE" on the basis of an operation performed by the evaluator on the safety device 400 (symbol M22). At this time, the reset variables are maintained to be "FALSE". Corresponding to the change, it is confirmed that all the output variables registered are "TRUE" (symbols M24 and M28). If any one of the output variables is "FALSE", it is determined that some type of abnormality has occurred (symbols M26 and M30).

In a case in which the "automatic reset" (first type) is set as described above, when the output value of the output signal of the evaluation target in a case in which the value of the input signal is returned from "FALSE" to "TRUE" is different from "FALSE" (first output value), it is determined as normal.

Next, a procedure for the functional safety evaluation in a case in which the "manual reset" is set as a reset type will be described with reference to FIG. 10(B). Since the initialization phase and the blocked phase in the procedure for the functional safety evaluation in the case in which the "manual reset" is set are the same as the initialization phase and the blocked phase of the "automatic reset" illustrated in FIG. 10(A), respectively, description thereof will be omitted.

In the restoration phase, the input variable 1 changes from "FALSE" to "TRUE" on the basis of an operation performed by the evaluator on the safety device 400 (symbol M32). At this time, the reset variables are maintained to be "FALSE". Corresponding to the change, it is confirmed that the output variable 1 for which the expected value setting has been checked (scheduled to be linked to the input variable 1) is "FALSE" (symbol M36). If the output variable 1 has changed to "TRUE", it is determined that linking with the input variable 1 has been established without waiting for the change of the reset variables, and some type of abnormality has occurred (symbol M38).

Subsequently, the reset variables are once set to "TRUE" (symbol M40) and are then set to "FALSE" (symbol M42). Corresponding to the change, it is confirmed that all the output variables registered are "TRUE" (symbol M44). If any of the output variable is "FALSE", it is determined that some type of abnormality has occurred (symbol M46).

As described above, in a case in which the "manual reset" (second type) is set, when the output value of the output signal of the evaluation target in a case in which the value of the input signal is returned from "FALSE" to "TRUE" coincides with "FALSE" (first output value), it is determined as normal. Further, the reset signal is enabled, and it is determined whether or not a value (third output value) of the output signal of the evaluation target decided by the computation processing in accordance with the safety program 10 coincides with the value (first output value) in the blocked phase.

<I. Setting of Evaluation Conditions>

The evaluation system 1 according to the embodiment executes the functional safety evaluation as illustrated in FIGS. 10(A) and 10(B) in response to an operation performed by the evaluator on the safety device 400. Hereinafter, a method of setting evaluation conditions 20 required for executing the functional safety evaluation and the like will be described.

Figure 11:
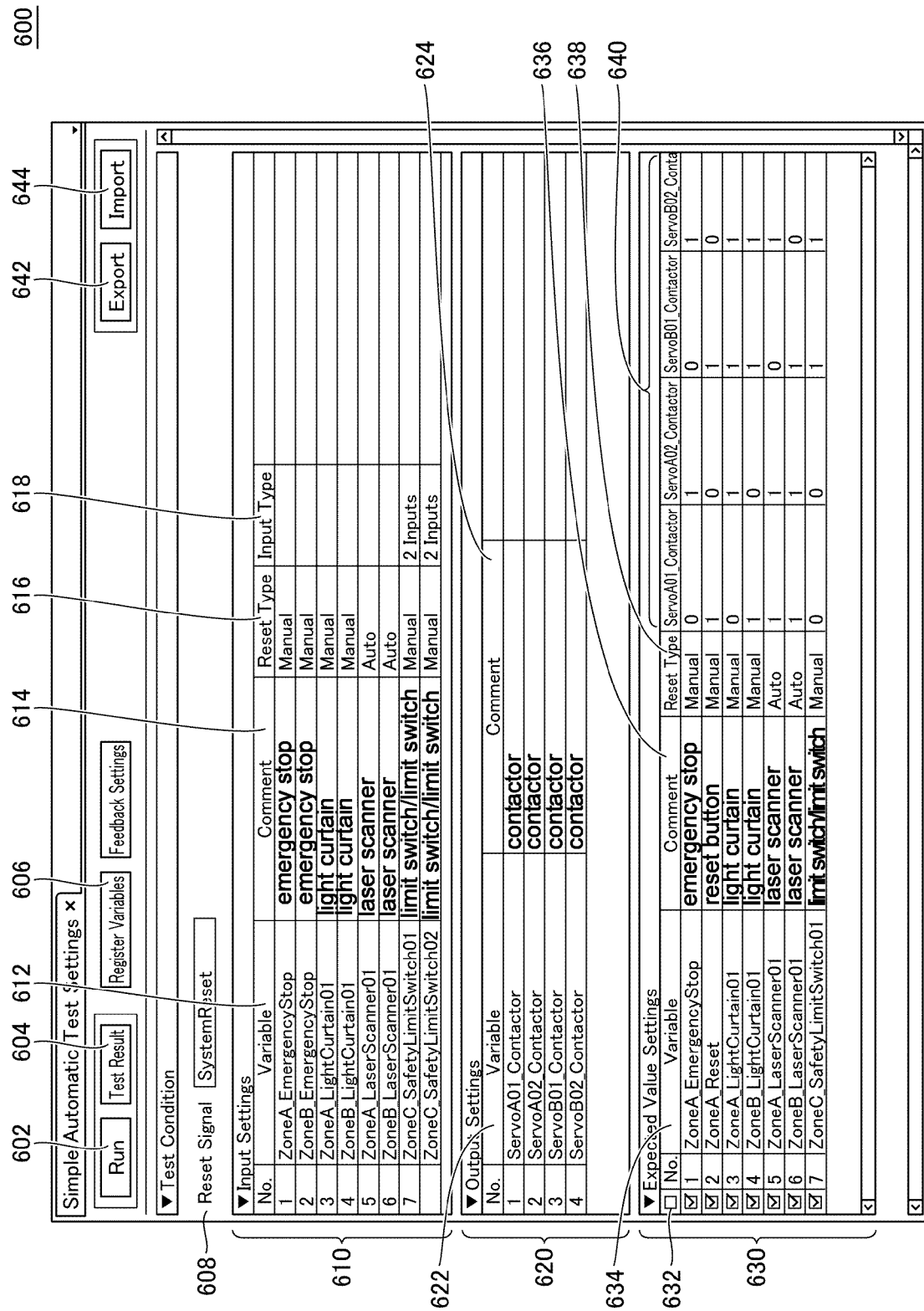
FIG. 11 is a schematic view illustrating an example of a user interface screen for setting evaluation conditions in the evaluation system according to the embodiment.

FIG. 11 is a schematic view illustrating an example of a user interface screen for setting the evaluation conditions 20 by the evaluation system 1 according to the embodiment. The evaluation system 1 displays a setting screen 600 as illustrated in FIG. 11 and receives setting of the settings screen 600 from the user.

More specifically, the setting screen 600 includes a RUN button 602 that provides an instruction for executing the functional safety evaluation, a display button 604 that displays execution results of the functional safety evaluation, a variable registration button 606 that registers variables of the evaluation target, a reset variable setting area 608 that sets variables used for reset variables, an input setting display area 610 that displays setting values related to the input variables, an output setting display area 620 that displays setting values related to the output variables, and an expected value setting area 630 that sets an expected value (hereinafter, also referred to as an "expected output value") of the output variables with respect to the input variables.

In the reset variable setting area 608, a variable to be commonly input to function blocks included in the safety program of the evaluation target as a reset signal is set. That is, the evaluation conditions 20 include setting of a reset signal as a reset condition of the automatic reset defined in advance. In addition, although a single reset signal is commonly input in the setting screen 600 illustrated in FIG. 11, separate reset signals may be used for the respective function blocks.

In the input setting display area 610, information related to the input variables included in the target safety program can be registered and displayed. In the output setting display area 620, information related to the output variables included in the target safety program can be registered and displayed. The registration of the variables in the input setting display area 610 and the output setting display area 620 is enabled by selecting the variable registration button 606.

The input setting display area 610 includes a variable name display section 612 that displays variable names of the input variables set in advance, a comments display section 614 that displays comments for corresponding input variables, a reset type display section 616 that displays reset types of the corresponding input variables, and an input type display section 618 that displays input types of the corresponding input variables.

The output setting display area 620 includes a variable name display section 622 that displays variable names of the output variables set in advance and a comments display section 624 that displays comments for the corresponding output variables.

The expected value setting area 630 receives evaluation conditions necessary for the functional safety evaluation according to the embodiment. That is, the respective rows in the expected value setting area 630 correspond to the respective conditions of the functional safety evaluation. Specifically, the expected value setting area 630 includes an input variable display area 634 that displays input variables as targets, a comments display section 636 that displays comments for the corresponding input variables, a reset type display section 638 that displays the reset types of the corresponding input variables, and an expected value setting section 640 that sets expected output values of the respective output variables for the corresponding input variables.

In the expected value setting section 640, output values (expected output values) corresponding to the number of output variables as targets are set for one input variable. In the example of the setting screen 600 illustrated in FIG. 11, four sections are provided to correspond to the four output variables displayed in the output setting display area 620, and expected output values can be set in the respective sections. The user sets an appropriate value in the expected value setting section 640 on the basis of prior safety design. In addition, "0" means that a corresponding output variable also changes to "FALSE" in a case in which a corresponding input variable becomes "FALSE", and "1" means that the corresponding output variable is maintained to be "TRUE" even in a case in which the corresponding input variable becomes "FALSE" in the expected value setting section 640 in FIG. 11.

In a case in which a specific emergency stop button A is for triggering a safety operation of an apparatus A present in a hazard area A, "FALSE" indicating the safety operation, that is, "0" is set as an expected output value for an output variable indicating a command to a safety relay that manages emergency stop of the apparatus A in the hazard area A in association with an input variable corresponding to an input signal from the emergency stop button A. Meanwhile, in a case in which the emergency stop button A is not directed to a hazard area B, and another emergency stop button B is provided for the hazard area B, stop of the apparatus B in the hazard area B in response to an operation on the emergency stop button A is not scheduled. Therefore, "TRUE" indicating that the safety operation is not performed, that is, "1" is set as an expected output value for an output variable indicating a command to a safety relay that manages emergency stop of the apparatus B in the hazard area B in association with an input variable corresponding to an input signal from the emergency stop button A. As described above, a relation between each input variable and each output variable is set in the expected value setting section 640.

The expected value setting area 630 includes a check box 632 for setting whether or not to set each input variable to be a target of the functional safety evaluation. In the functional safety evaluation according to the embodiment, the values (input values) of input variables with checked corresponding check boxes 632 are changed, and it is determined whether or not the value of each output variable coincides with the expected value set in the expected value setting section 640.

As illustrated in FIG. 11, the expected value setting section 640 receives the evaluation conditions 20 including an input signal of the evaluation target, an output signal of the evaluation target, and an expected output value as a value of an output signal of the evaluation target to be output corresponding to a change in the value of the input signal of the evaluation target. In general, a plurality of sets each including the input signal, the output signal, and the expected output value can be included in the evaluation conditions 20.

As described above with reference to FIG. 11, the evaluation system 1 according to the embodiment receives evaluation conditions including an input signal of the evaluation target, an output signal of the evaluation target, and an expected output value as a value of an output signal of the evaluation target to be output corresponding to a change in the value of the input signal of the evaluation target.

Next, one example of a function of facilitating setting of an expected output value in the expected value setting section 640 included in the setting screen 600 illustrated in FIG. 11, as a part of evaluation conditions, will be described.

The evaluation system 1 according to the embodiment can externally read data of expected output values shown in a general format (typically, a comma-separated values (CSV) format or a text format) in order to facilitate setting and reuse of the expected output values. In addition, it is also possible to output expected output values set in advance as the data in a general format.

Figure 12:
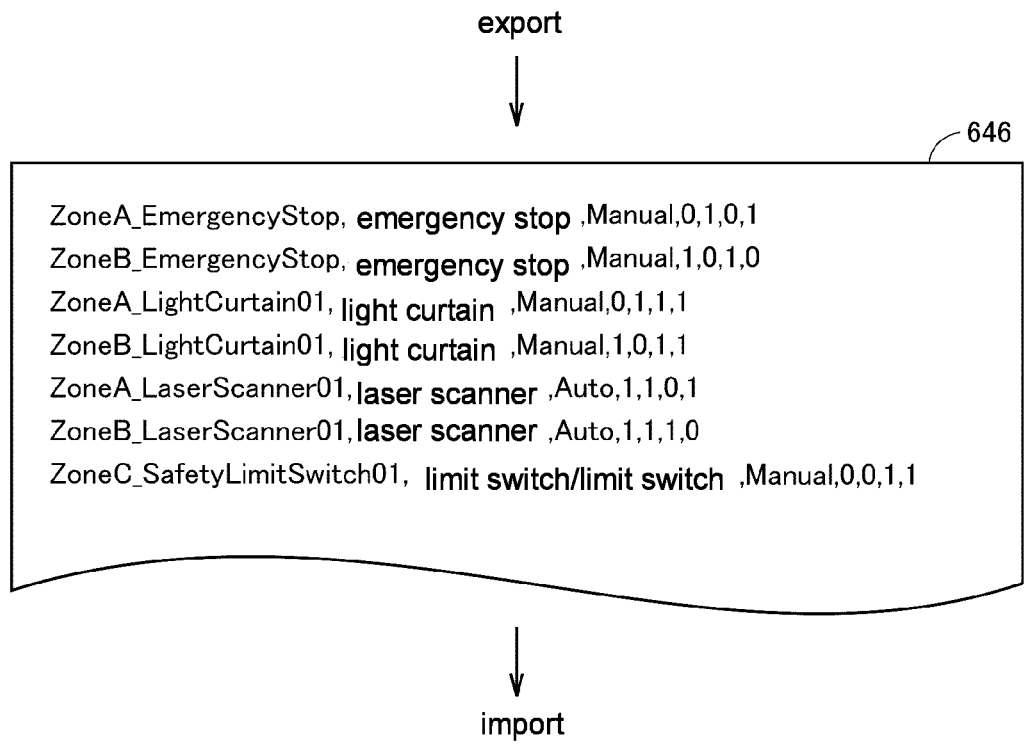
FIG. 12 is a diagram for explaining export processing and import processing of expected output values in the evaluation system according to the embodiment.

FIG. 12 is a diagram for explaining export and import processing of expected output values in the evaluation system according to the embodiment. If the user selects an export button 642 (FIG. 11) in the setting screen 600, for example, a list of expected output values set in the expected value setting section 640 in the setting screen 600 is externally output/saved as data (external output data 646) in CSV format.

In addition, if the user selects an import button 644 (FIG. 11) in the setting screen 600, data (external output data 646) in CSV format prepared in advance is read, and the respective values are set in the expected value setting section 640 in the setting screen 600.

In this manner, cooperation with another application or the like is enhanced, and the functional safety evaluation can be more quickly and easily performed by mounting the function of externally outputting and externally reading the expected output values as data in a general format.

In addition to the cooperation with another application using the file illustrated in FIG. 12, expected output values set by another application may be directly used.

Figure 13:
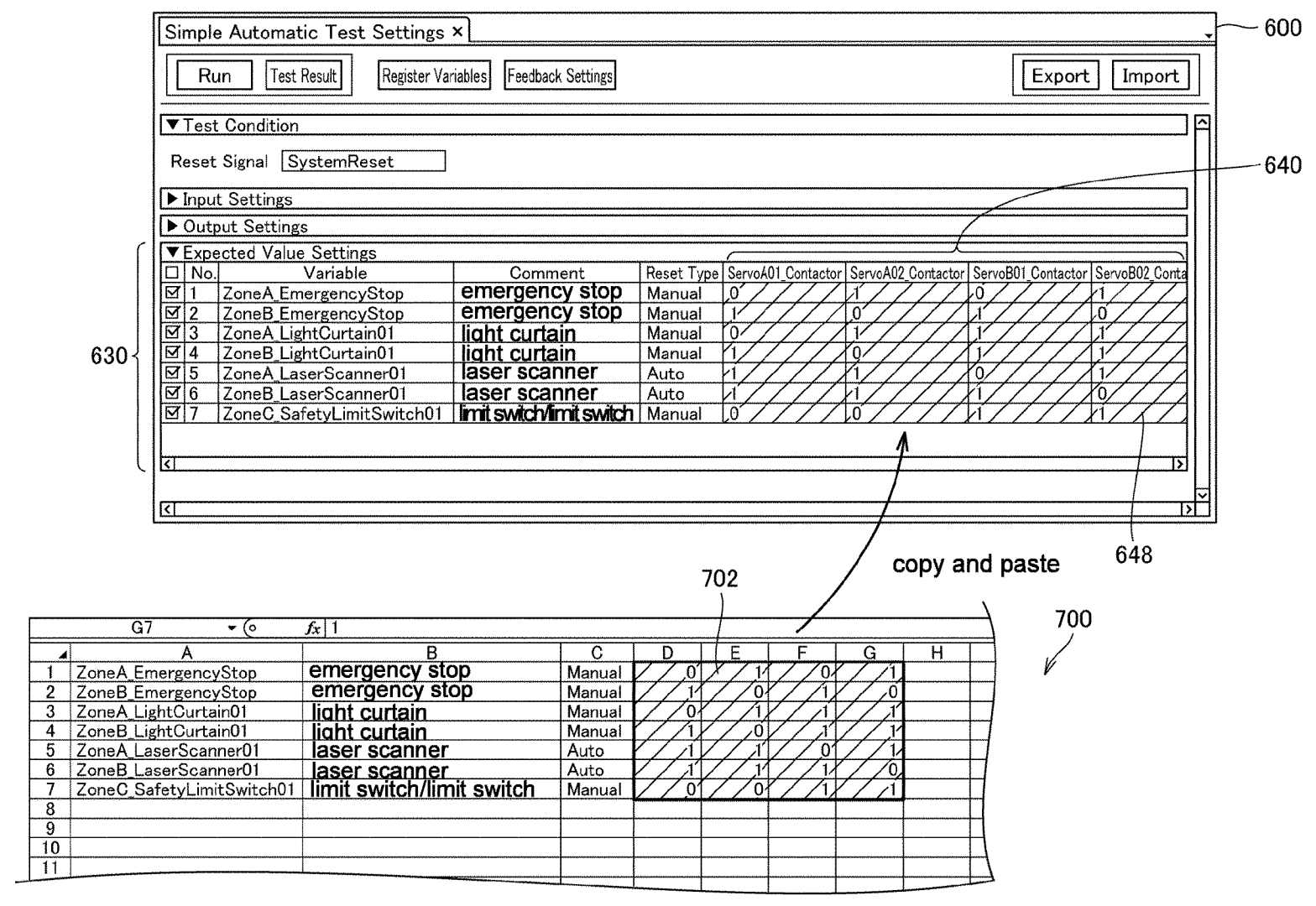

FIG. 13 is a diagram for explaining processing of setting the expected output values in cooperation with another application in the evaluation system according to the embodiment. Referring to FIG. 13, an expected output value that the user desires can be set by creating a table indicating the expected output values set in the expected value setting section 640 on a spreadsheet application 700, selecting and copying a target range 702 of the created table, and pasting the range 702 on the expected value setting section 600 in the setting screen 640 (a so-called copy and paste operation), for example.

In addition, although FIG. 13 illustrates an example of cooperation with the spreadsheet application as a typical example, the cooperation is not limited thereto, and cooperation with any kind of application can be established as long as a copy and paste operation can be performed for the application.

In this manner, the expected output value can easily be set by cooperation with another application.

<J. Processing Procedure for Functional Safety Evaluation>

As described above, the information processing apparatus 200 sequentially presents content of operations to be performed on the safety device 400 in the functional safety evaluation of the safety program 10. The information processing apparatus 200 sequentially executes the functional safety evaluation of the safety program 10 due to the evaluator sequentially operating the safety device 400 in accordance with the presented content of operations.

Hereinafter, an example of screen transitions of the information processing apparatus 200 in the process of the functional safety evaluation of the safety program 10 will be described with reference to FIGS. 14 to 18. FIGS. 14 to 18 are diagrams illustrating screen transitions of the information processing apparatus 200 in a chronological order.

Referring to FIG. 14, an evaluation execution screen 650 includes a variable name display section 654 that displays variable names of target input variables, a comments display section 656 that displays comments for corresponding input variables, a reset type display section 658 that displays reset types for corresponding input variables, an expected value setting section 660 that displays combinations of expected output values for corresponding input variables, a results display section 672 that indicates evaluation results, a results comments display section 674 that displays comments corresponding to the evaluation results, and a date and time display section 676 that indicates an evaluation execution date and time.

Typically, the safety controller 100 executes evaluation processing in accordance with a display order of input variables that are displayed in the variable name display section 654. In the example in FIG. 14, the safety controller 100 selects an evaluation item "No. 1" to which an input variable "ZoneA_EmergencyStop" has been assigned as a first evaluation target. The evaluation item selected as the evaluation target may be displayed in a different mode from that of the other evaluation items. Although the evaluation item selected as the evaluation target is shown with hatching in the example in FIG. 14, the evaluation target may be shown in another mode, such as with a different color.

Next, the information processing apparatus 200 displays operation content 680 of the safety device 400 to which an input variable "ZoneA_EmergencyStop" has been assigned as illustrated in FIG. 15. The operation content 680 includes, for example, identification information of the safety device 400 of an operation target, an operation procedure for the safety device 400 of the operation target, and a reset type for the safety device 400. The identification information of the safety device 400 of the operation target may be represented by an input variable name or may be represented by a name of the safety device 400. In the example in FIG. 15, the emergency stop button is shown as the operation target, and an operation procedure of changing the input variable "ZoneA_EmergencyStop" to "FALSE" by "blocking" the emergency stop button is shown. In this manner, the safety controller 100 causes the information processing apparatus 200 to display the operation content 680 for changing the value of the input signal from "TRUE" to "FALSE" when the value of the input signal of the evaluation target is to be changed from "TRUE" (first input value) to "FALSE" (second input value).

If an OK button of the operation content 680 is pressed, the safety controller 100 inputs the input variable "ZoneA_EmergencyStop" to the safety program: In a case in which the emergency stop button has been pressed, the input variable "ZoneA_EmergencyStop" is set to "FALSE". The safety controller 100 acquires an output signal output from the safety program as a computation result. The safety controller 100 compares the value of the output signal with the expected output value of the output signal. Thereafter, the safety controller 100 moves the evaluation processing ahead to the next step.

Next, the information processing apparatus 200 displays operation content 681 for the safety device 400 to which the input variable "ZoneA_EmergencyStop" has been assigned as illustrated in FIG. 16. In the example in FIG. 16, an instruction for changing the input variable "ZoneA_EmergencyStop" to "TRUE" by "restoring" the emergency stop button is provided. In this manner, the safety controller 100 causes the information processing apparatus 200 to display the content of the operation 681 for changing the value of the input signal of the evaluation target from "FALSE" to "TRUE" when the value of the input signal is to be changed from "FALSE" (second input value) to "TRUE" (first input value).

If an OK button of the content of the operation 681 is pressed, the safety controller 100 inputs the input variable "ZoneA_EmergencyStop" to the safety program. In a case in which the pressed state of the emergency stop button is released, the input variable "ZoneA_EmergencyStop" is set to "TRUE". The safety controller 100 acquires an output signal output from the safety program to each output device as a computation result. As described above, in a case in which the reset type is set to "Manual", the safety controller 100 confirms that the value of the output variables has not changed. Thereafter, the safety controller 100 moves the evaluation processing ahead to the next step.

Next, the safety controller 100 displays an evaluation result for the evaluation item "No. 1" for which the evaluation processing has been completed in the results display section 672 and also displays evaluation date and time of the evaluation item in the date and time display section 676 as illustrated in FIG. 17. In the example in FIG. 17, "Passed" indicating that the evaluation item has passed is displayed in the results display section 672, and "2017/01/21/10:04:24" is displayed in the date and time display section 676. Thereafter, the safety controller 100 selects an evaluation item "No. 2" to which the input variable "ZoneA_Reset" has been assigned as the next evaluation target. At this time, the information processing apparatus 200 displays the evaluation item "No. 2" in a different display mode from that of the other evaluation items. In this manner, the evaluator can easily recognize the current evaluation item of the evaluation target.

Next, the information processing apparatus 200 displays an operation content 682 for the safety device 400 to which the input variable "ZoneA_Reset" has been assigned as illustrated in FIG. 18. In the example in FIG. 18, a reset button is shown as an operation target, and an instruction for changing the input variable "ZoneA_Reset" in the order of "FALSE"→"TRUE"→"FALSE" by operating the reset button is provided.

If an OK button of the content of the operation 682 is pressed, the safety controller 100 inputs the input variable "ZoneA_Reset" to the safety program. In a case in which the reset button is pressed, the input variable "ZoneA_Reset" changes in the order of "FALSE"→"TRUE"→"FALSE". The safety controller 100 acquires an output signal output from the safety program to each output device as a computation result. The safety controller 100 compares the value of the output signal output to each output device with each expected output value shown in "No. 2" of the expected value setting section 660. Thereafter, the safety controller 100 moves the evaluation processing ahead to the next step.

The evaluation processing is sequentially executed on the remaining evaluation items "No. 3" to "No. 7". In this manner, the safety controller 100 causes the information processing apparatus 200 to sequentially display operation content of the safety device 400 to be operated in an order set in advance in the evaluation execution screen 650, and also sequentially executes the evaluation processing in response to an operation performed by the evaluator on the safety device 400.

In addition, although the example in which the evaluation processing is sequentially executed in the order set in the evaluation execution screen 650 has been described above, the evaluation processing may be executed in a random order. In such a case, the evaluator operates the safety device 400 in an order that the evaluator itself decides. The safety controller 100 acquires an output signal from the safety program every time the safety device 400 is operated and compares the value of the output signal with an expected output value associated with the safety device 400 operated.

In addition, although the example in which the evaluation processing is moved ahead to the next step by pressing the OK buttons of the operation contents 680 to 682 has been described above, the safety controller 100 may monitor an input signal from the safety device 400 of the operation target and automatically move the evaluation processing ahead to the next step on the basis of a change in the input signal.

<K. Evaluation Results of Functional Safety Evaluation>

Next, evaluation results of the functional safety evaluation illustrated in FIGS. 14 to 18 will be described.

The evaluation system 1 according to the embodiment has a function of outputting evaluation results of the functional safety evaluation in association with an input signal of an evaluation target.

FIG. 19 is a schematic view illustrating an example of evaluation results of the functional safety evaluation that is executed by the evaluation system 1 according to the embodiment. Referring to FIG. 19, the evaluation results screen 651 includes the variable name display section 654 that displays variable names of input variables as targets, the comments display section 656 that displays comments for corresponding input variables, the reset type display section 658 that displays reset types for corresponding input variables, the expected value setting section 660 that displays combinations of expected output values for corresponding input variables, the results display section 672 that shows evaluation results, the results comments display section 674 that displays comments corresponding to the evaluation results, and the date and time display section 676 that shows the evaluation execution date and time.

"Passed" is displayed for an evaluation item that has passed the aforementioned evaluation in the results display section 672, and "Failed" is displayed for an evaluation item for which some type of error has occurred. Further, in a case in which some type of error has occurred, the display mode of the output variable for which the error has occurred is set to be different in the expected value setting section 660. An error message corresponding to the error is displayed in the results comments display section 674. That is, information specifying in which of phases abnormal determination has been made is included in the determination results. Also, comments in accordance with the phase in which the occurrence of the abnormality has been determined is included in the determination results.

As illustrated in FIG. 19, the evaluation conditions 20 generally includes a plurality of sets each including an input signal of the evaluation target, an output signal of the evaluation target, and an expected output value. Also, the aforementioned evaluation processing is executed for each set. Information specifying which of the sets includes the input signal that has been determined to be abnormal is included in the determination results.

In addition, the evaluation conditions 20 generally includes a set of an input signal of the evaluation target, a plurality of output signals of the evaluation target, and a plurality of expected output value that respectively correspond thereto as illustrated in FIG. 19. In addition, the evaluation processing is executed on each of the plurality of expected output values as described above. Information specifying which of the output signals has been determined to be abnormal is included in the determination results.

If an error occurs in any of the output variables with reference to such an expected output value, it is possible to more effectively perform the functional safety evaluation for the safety program by associating and displaying the content of the error with the expected output value.

FIG. 20 is a diagram illustrating a modification example of the evaluation results screen 651 illustrated in FIG. 19. As illustrated in FIG. 20, the evaluation results screen 651 may further include an entry section 673 of the evaluator. In the entry section 673, results of visually checking the operation mode of the output device by the evaluator are input. In the example in FIG. 20, the entry section 673 is shown as check boxes. In a case in which the output device operates normally in response to an operation performed on the safety device 400, the evaluator checks a check box. If this is not so, the evaluator does not check a check box.

In addition, the entry section 673 may be shown in a mode different from check boxes. In one example, the entry section 673 may be shown as text input regions or may be shown as radio buttons with which any of "Passed" and "Failed" can be selected.

<L. Printed Results of Functional Safety Evaluation>

In a case in which an export button 690 in the evaluation results screen 651 illustrated in FIG. 20 is pressed, the evaluation results are output as a file. In a case in which a print button 691 in the evaluation results screen 651 illustrated in FIG. 20 is pressed, the evaluation results are printed. FIG. 21 is a diagram illustrating an example of printed evaluation results.

As illustrated in FIG. 21, the printed results 651A include content shown in the evaluation results screen 651 in FIG. 20. More specifically, the printed results 651A include a variable name section 654A that displays variable names of input variables as targets, a comments section 656A that displays comments for the corresponding input variables, a reset type section 658A that displays reset types for the corresponding input variables, an expected value setting section 660A that displays combinations of expected output values for the corresponding input variables, a results section 672A that shows evaluation results, an entry section 673A of the evaluator, a results comments section 674A that displays comments corresponding to the evaluation results, and a date and time section 676A that shows an evaluation execution date and time. In addition, the printed results 651A include an evaluation conduction date section 695, a name entry section 696 of the evaluator, and a signature entry section 697 of the evaluator.

The variable name section 654A of the printed result 651A corresponds to the variable name display section 654 in the evaluation results screen 651. The comments section 656A of the printed result 651A corresponds to the comments display section 656 in the evaluation results screen 651. The reset type section 658A of the printed results 651A corresponds to the reset type display section 658 in the evaluation results screen 651. The expected value setting section 660A of the printed result 651A corresponds to the expected value setting section 660 in the evaluation results screen 651. The results screen 672A of the printed result 651A corresponds to the results display section 672 in the evaluation results screen 651. The entry section 673A of the printed result 651A corresponds to the entry section 673 in the evaluation results screen 651. The results comments section 674A of the printed result 651A corresponds to the results comments display section 674 in the evaluation results screen 651. The date and time section 676A of the printed result 651A corresponds to the date and time display section 676 in the evaluation results screen 651.

<M. Processing Procedure for Functional Safety Evaluation>

Next, a processing procedure for the functional safety evaluation according to the embodiment will be described. If a pair of an input variable of an evaluation target and a corresponding expected output value is set in the setting screen 600 as illustrated in FIG. 11, the functional safety of the target safety program is evaluated in the following procedure.

Figure 22:
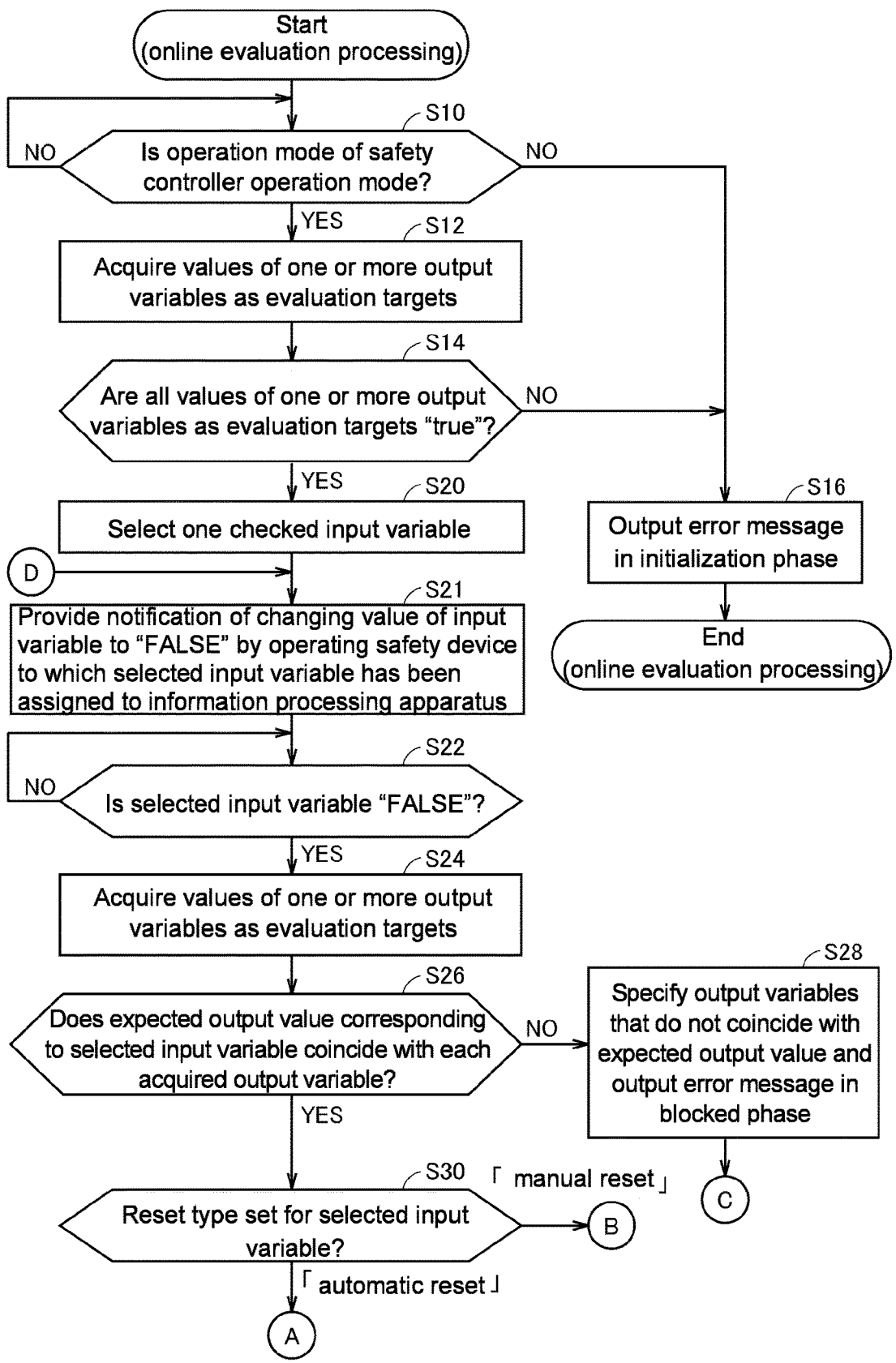
FIG. 22 is a flowchart illustrating a processing procedure for the functional safety evaluation that is executed by the evaluation system according to the embodiment.
Figure 23:
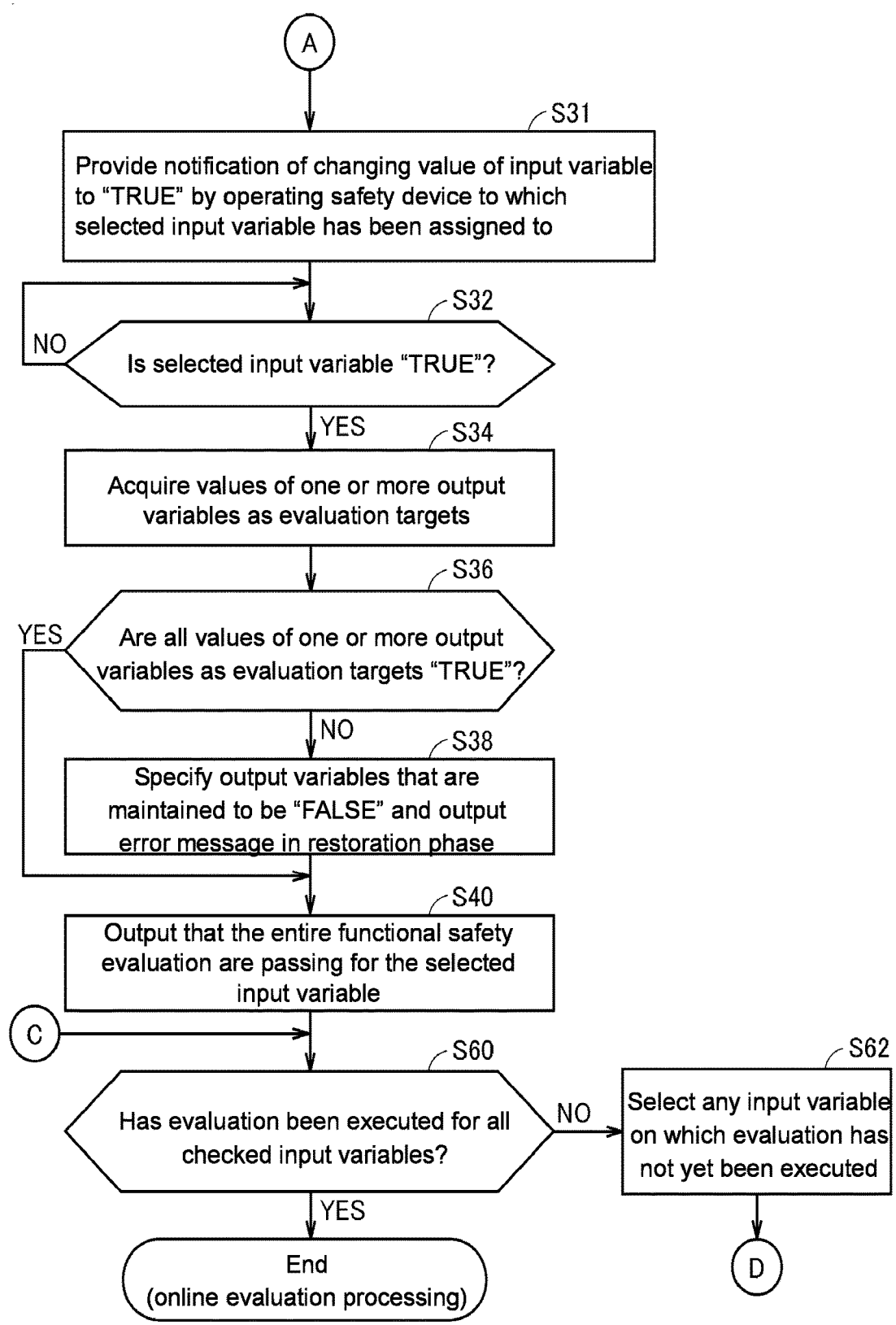
FIG. 23 is a flowchart illustrating a processing procedure for the functional safety evaluation that is executed by the evaluation system according to the embodiment.
Figure 24:
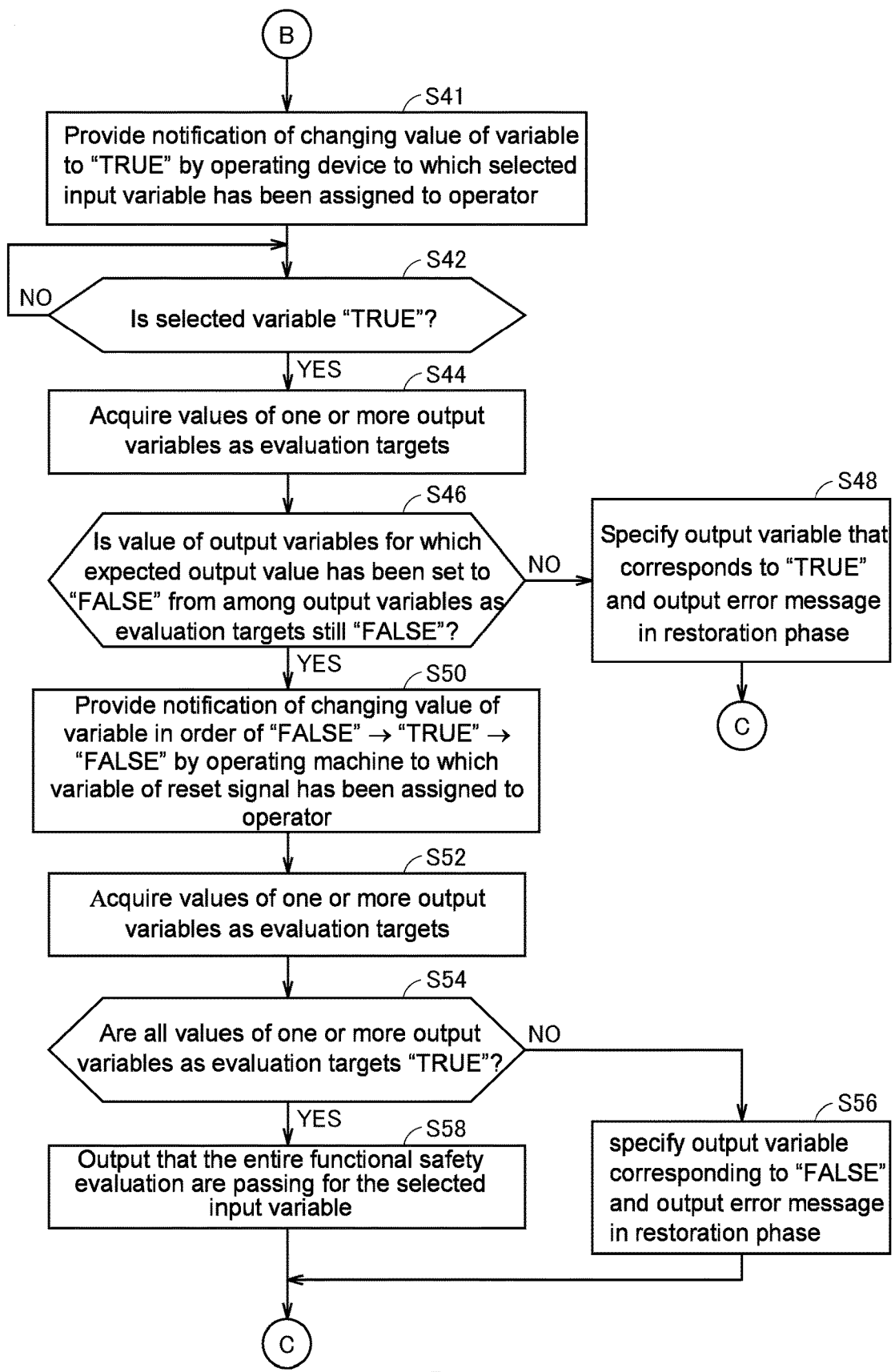
FIG. 24 is a flowchart illustrating a processing procedure for the functional safety evaluation that is executed by the evaluation system according to the embodiment.

FIGS. 22 to 24 are flowcharts illustrating a processing procedure for the functional safety evaluation that is executed by the evaluation system 1 according to the embodiment. The respective steps illustrated in FIGS. 22 to 24 are typically realized by the processor 102 (see FIG. 3) executing the functional safety evaluation program. In addition, the evaluation conditions illustrated in FIG. 11 are assumed to be set in advance.

Referring to FIGS. 22 to 24, it is determined whether an operation mode of the safety controller is an operation mode (Step S10). In a case in which the operation mode of the safety controller is the operation mode (YES in Step S10), the processor 102 switches control to Step S12. If this is not so (NO in Step S10), the processor 102 executes the processing in Step S10 again.

The processor 102 once sets the reset variables to "TRUE", then returns the reset values to "FALSE", and acquires values of one or more output signals as evaluation targets (Step S12). Thereafter, it is determined whether or not all the one or more output variables as the evaluation targets are "TRUE" (Step S14).

In a case in which any of the values of the output variables as the evaluation targets are "FALSE" (in a case of NO in Step S14), the output variable corresponding to "FALSE" is identified, and an error message in the initialization phase is output (Step S16). In such a case, the following processing of the functional safety evaluation is suspended. As the error message in the initialization phase, "The output variable (XXX) has become FALSE at the time of resetting" may be used, for example.

In a case in which all the values of the output variables as the evaluation targets are "TRUE" (in a case of YES in Step S14), processing of the following blocked phase and the restoration phase is executed. The processing in the blocked phase and the restoration phase is repeated for each input variable set in the expected value setting area 630 (evaluation conditions 20).

Specifically, one of input variables with a checked corresponding check box 632 is selected from among the input variables set in the expected value setting area 630 first (Step S20). Then, the processor 102 provides a notification of changing the value of the input variable from "TRUE" to "FALSE" by operating the safety device 400 to which the selected input variable has been assigned to the information processing apparatus 200.

Thereafter, the processor 102 determines whether or not the selected input variable has changed from "TRUE" to "FALSE" (Step S22). In a case in which the selected input variable has changed from "TRUE" to "FALSE" (YES in Step S22), the processor 102 switches the control to Step S24. If this is not so (NO in Step S22), the processor 102 executes the processing in Step S22 again.

Thereafter, the processor 102 acquires values of one or more output variables as the evaluation targets (Step S24). That is, the selected input variable is blocked. Subsequently, it is determined whether or not an expected output value for each of the output variables as the evaluation targets corresponding to the selected input variable coincides with the each of the values of the acquired output variables (Step S26). That is, it is determined whether or not the acquired values for the output variables for which "FALSE" has been set as an expected output value are "FALSE", and it is determined whether or not the acquired values for the output variables for which "TRUE" has been set as an expected output value are "TRUE".

In a case in which the value acquired for any of the output variables and the expected output value do not coincide (in a case of NO in Step S26), the output variable that does not coincide with the expected output value is specified, and an error message in the blocked phase is output (Step S28). In such a case, the following restoration phase is skipped, and the processing in Step S60 is executed. As the error message in the blocked phase, "The output variable (XXX) does not coincide with the expected output value", for example, is used.

Meanwhile, in a case in which all the expected output values for the respective output variables of the evaluation target coincide with all the respective values of the acquired output variables (in a case of YES in Step S26), processing in the restoration phase is subsequently executed. That is, processing of returning the value of the input signal of the evaluation target from "FALSE" (second input value) to "TRUE" (first input value) and determining whether or not a second output value of an output signal of an evaluation target decided by the computation in accordance with the safety program coincides with the first output value is executed.

Specifically, it is determined which of the "automatic reset" and the "manual reset" the reset type set for the selected input variable is (Step S30).

In a case in which the "automatic reset" is set as a reset type (in a case of "automatic reset" in Step S30), the processor 102 provides a notification of changing the value of the input variable from "FALSE" to "TRUE" by operating the safety device 400 to which the selected input variable has been assigned to the information processing apparatus 200 (Step S31).

Thereafter, the processor 102 determines whether or not the selected input variable has changed from "FALSE" to "TRUE" (Step S32). In a case in which the selected input variable has changed from "FALSE" to "TRUE" (YES in Step S32), the processor 102 switches the control to Step S34. If this is not so (NO in Step S32), the processor 102 executes the processing in Step S32 again.

Thereafter, the processor 102 acquires values of one or more output variables as evaluation targets (Step S34). Subsequently, it is determined whether or not values of all the output variables as the evaluation targets corresponding to the selected input variable are "TRUE" (Step S36). That is, it is determined whether or not all the corresponding output variables have been restored with the restoration of the selected input variable.

In a case in which any of the values of the output variables as the evaluation targets have been maintained to be "FALSE" (in a case of NO in Step S36), the output variables maintained to be "FALSE" are specified, an error message in the restoration phase is output (Step S38), and the processing in Step S60 is executed. As the error message in the restoration phase, "The output variable (XXX) has not been automatically restored", for example, is used.

Meanwhile, in a case in which any one of the values of the output variables as the evaluation targets are "TRUE" (in a case of YES in Step S36), for the selected input variable, it is output that the entire functional safety evaluation are passing (Step S40), and the processing in Step S60 is executed.

In a case in which the "manual reset" is set as a reset type (in a case of the "manual reset" in Step S30), the processor 102 provides a notification of changing the value of the input variable from "FALSE" to "TRUE" by operating the safety device 400 to which the selected input variable has been assigned to the information processing apparatus 200 (Step S41).

Thereafter, the processor 102 determines whether or not the selected input variable has changed from "FALSE" to "TRUE" (Step S42). In a case in which the selected input variable has changed from "FALSE" to "TRUE" (YES in Step S42), the processor 102 switches the control to Step S44. If this is not so (NO in Step S42), the processor 102 executes the processing in Step S42 again.

Thereafter, the processor 102 acquires values of one or more output variables as evaluation targets (Step S44). That is, the selected input variable is restored. Subsequently, it is determined whether or not all the values of the output variables for which the expected output values have been set to "FALSE" from among the output variables as the evaluation targets corresponding to the selected input variable have been maintained to be "FALSE" (Step S46). That is, it is determined that the values of the output variables as the targets of the "manual reset" have not been restored with the restoration of the selected input variable.

In a case in which any of the values of the output variables for which all the expected output values have been set to "FALSE" is "TRUE" (in a case of NO in Step S46), output variables corresponding to "TRUE" are specified, an error message in the restoration phase is output (Step S48), and processing in Step S60 is executed. As the error message in the restoration phase, "The output variable (XXX) has been automatically restored", for example, is used.

In a case in which all the values of the output variables for which all the expected output values have been set to "FALSE" are "FALSE" (in a case of YES in Step S46), processing of enabling a reset signal and determining whether or not the third output value of the output signal as the evaluation target decided by the computation in accordance with the safety program coincides with the first output value is executed. That is, the reset variables are once set to "TRUE" and are then returned to "FALSE" (Step S50), and values of one or more output variables as evaluation targets are acquired (Step S52). That is, the reset variable is activated. Subsequently, it is determined whether or not all the values of one or more output variables as the evaluation targets are "TRUE" (Step S54).

In a case in which any of the values of the output variables as the evaluation target are "FALSE" (in a case of NO in Step S54), the output variable corresponding to "FALSE" is specified, and an error message in the restoration phase is output (Step S56). As the error message in the restoration phase, "The output variable (XXX) has been set to FALSE at the time of resetting", for example, is used.

In a case in which all the values of the output variables as the evaluation targets are "TRUE" (in a case of YES in Step S54), for the selected input variable, it is output that the entire functional safety evaluation are passing (Step S58), and the processing in Step S60 is executed.

In Step S60, it is determined whether or not evaluation has been executed on all the input variables with the checked corresponding check boxes 632 from among the input variables set in the expected value setting area 630 (Step S60). In a case in which the evaluation has not yet been executed on any of the checked input variables (NO in Step S60), any input variable for which the evaluation has not yet been executed is selected (Step S62), and the processing in and after Step S21 is executed again.

In the case in which the evaluation has been executed on all the checked input variables (in a case of YES in Step S60), the processing of the functional safety evaluation is completed.

According to an aspect of the invention, there is provided an evaluation system that evaluates functional safety for a safety program in order to cause an output device to operate such that safety is maintained if predetermined condition is satisfied, the evaluation system including: a processing execution means for deciding a value of an output signal to be output to one or more corresponding output devices by executing computation in accordance with the safety program, on the basis of an input signal from any of one or more input devices; a setting means for receiving an evaluation condition that includes an input signal of an evaluation target and an expected output value as a value of an output signal to be output to an output device corresponding to a change in a value of the input signal; a first determination means for determining whether or not a first output value of an output signal decided by the processing execution means coincides with the expected output value on the basis of reception of a change in the value of the input signal of the evaluation target from a first input value as an initial value to a second input value from an input device of the evaluation target; a second determination means for determining whether or not a second output value of an output signal decided by the processing execution means coincides with the first output value on the basis of reception of returning of the value of the input signal of the evaluation target from the second input value to the first input value from the input device of the evaluation target; and an output means for outputting determination results of the first determination means and the second determination means in association with the input signal of the evaluation target.

According to an embodiment of the invention, the evaluation system further includes a presenting means for causing an information processing apparatus to present operation content for the input device of the evaluation target.

According to an embodiment of the invention, the presenting means causes the information processing apparatus to present operation content for changing the value of the input signal from the first input value to the second input value when the value of the input signal of the evaluation target is to be changed from the first input value to the second input value, and causes the information processing apparatus to present operation content for changing the value of the input signal from the second input value to the first input value when the value of the input device of the evaluation target is to be changed from the second input value to the first input value.

According to an embodiment of the invention, the details of an operation include identification information of the input device of the evaluation target, and an operation procedure for the input device of the evaluation target.

According to an embodiment of the invention, the evaluation condition includes a plurality of sets each including the input signal of the evaluation target and the expected output value. The presenting means causes the information processing apparatus to successively present operation content of the input device of the evaluation target to be operated in accordance with an evaluation order set in advance.

According to an embodiment of the invention, the evaluation condition includes any one setting of a first type and a second type, wherein the first type indicates that an output value of a corresponding output signal is to be returned to an original value in conjunction with the value of the input signal being returned from the second input value to the first input value, and the second type indicates that the output value of the output signal is not to be returned to the original value until a reset condition set in advance is satisfied. The second determination means determines the second output value being different from the first output value as normal in a case in which the first type is set, and determines the second output value coinciding with the first output value as normal in a case in which the second type is set.

According to another aspect of the invention, there is provided a safety controller that evaluates functional safety for a safety program in order to cause an output device to operate such that safety is maintained if a predetermined condition is satisfied, the safety controller including: a processing execution means for deciding a value of an output signal to be output to one or more corresponding output devices by executing computation in accordance with the safety program, on the basis of an input signal from any of one or more input devices; a setting means for receiving an evaluation condition that includes an input signal of an evaluation target and an expected output value as a value of an output signal to be output to an output device corresponding to a change in a value of the input signal; a first determination means for determining whether or not a first output value of an output signal decided by the processing execution means coincides with the expected output value on the basis of reception of a change in the value of the input signal of the evaluation target from a first input value as an initial value to a second input value from an input device of the evaluation target; a second determination means for determining whether or not a second output value of an output signal decided by the processing execution means coincides with the first output value on the basis of reception of returning of the value of the input signal of the evaluation target from the second input value to the first input value from the input device of the evaluation target; and an output means for outputting determination results of the first determination means and the second determination means in association with the input signal of the evaluation target.

According to another aspect of the invention, there is provided a non-transitory computer readable storage medium that evaluates functional safety for a safety program in order to cause an output device to operate such that safety is maintained if a predetermined condition is satisfied, the non-transitory computer readable storage medium storing a plurality of program instructions, wherein the program instructions are loaded into a computer to execute steps of: deciding a value of an output signal to be output to one or more corresponding output devices by executing computation in accordance with the safety program, on the basis of an input signal from any of one or more input devices; receiving an evaluation condition that includes an input signal of an evaluation target and an expected output value as a value of an output signal to be output to an output device corresponding to a change in a value of the input signal; determining whether or not a first output value of an output signal decided by computation in accordance with the safety program coincides with the expected output value on the basis of reception of a change in the value of the input signal of the evaluation target from a first input value as an initial value to a second input value from an input device of the evaluation target; determining whether or not a second output value of an output signal decided by the computation in accordance with the safety program coincides with the first output value on the basis of reception of returning of the value of the input signal of the evaluation target from the second input value to the first input value from the input device of the evaluation target; and outputting determination results in the determining step in association with the input signal of the evaluation target.

According to another aspect of the invention, there is provided an evaluation method that evaluates functional safety for a safety program in order to cause an output device to operate such that safety is maintained if a predetermined condition is satisfied, the evaluation method including: deciding a value of an output signal to be output to one or more corresponding output devices by executing computation in accordance with the safety program, on the basis of an input signal from any of one or more input devices;

receiving an evaluation condition that includes an input signal of an evaluation target and an expected output value as a value of an output signal to be output to an output device corresponding to a change in a value of the input signal; determining whether or not a first output value of an output signal decided by the computation in accordance with the safety program coincides with the expected output value on the basis of reception of a change in the value of the input signal of the evaluation target from a first input value as an initial value to a second input value from an input device of the evaluation target; determining whether or not a second output value of an output signal decided by the computation in accordance with the safety program coincides with the first output value on the basis of reception of returning of the value of the input signal of the evaluation target from the second input value to the first input value from the input device of the evaluation target; and outputting determination results in the determining step in association with the input signal of the evaluation target.

According to an aspect of the invention, it is possible to evaluate functional safety for a designed safety program.

According to the embodiment, combinations each including an input signal included in a safety program and one or more output signals associated with the input signal are defined, and an expected value (expected output value) for each of the output signal values in each of the combinations is set. In addition, a reset type associated with each input signal is also set. Further, comprehensive functional safety of the safety program is evaluated in an actual machine by changing the value (input value) of the input signal in three phases (the initialization phase, the blocked phase, and the restoration phase) in response to an operation performed by the evaluator on the safety device 400 and determining whether or not the output value calculated in each phase is a value in accordance with the expected output value set in advance and the reset type. Therefore, it is possible to more accurately evaluate the functional safety of the safety program.

According to the embodiment, a phase in which abnormality has occurred and an output signal from which the abnormality has occurred are identified, and the phase and the output signal are output as evaluation results of the functional safety if the abnormality has occurred in any of the phases. Therefore, it is possible to easily identify a cause of and a solution for any type of defect in the functional safety of the safety program.

It should be considered that the embodiment disclosed herein is merely for illustrative purposes and is not intended to be restrictive in all respects. The scope of the invention is represented by the scope of the claims instead of the above description, and all modifications within the scope of the claims and equivalents thereof are intended to be included therein.

What is claimed is:

1. An evaluation system configured to evaluate functional safety for a safety program for causing one or more output devices to perform a safety operation on a controlled apparatus if an input signal is generated from any one or more input devices, wherein the any one or more input devices comprise one or more of a detection device that detects the presence or intrusion of persons and a device that receives operations in an emergency, and the one or more input devices generating the input signal are referred to as an evaluation target, the evaluation system comprising:
    a first hardware processor configured to decide a value of an output signal to be output to the one or more corresponding output devices by executing computation in accordance with commands included in the safety program, on the basis of the input signal from the any one of one or more input devices;
    a user input interface configured to set an evaluation condition that includes an input value of the input signal from the evaluation target and an expected output value, wherein the expected output value is an expected value of the output signal to be output to the one or more output devices and corresponds to the input value;
    a second hardware processor configured to determine whether or not a first output value of an output signal in a blocked phase decided by the first hardware processor coincides with the expected output value following a change in the value of the input signal of the evaluation target from a first input value to a second input value,
    wherein the second hardware processor is further configured to determine whether or not a second output value of the output signal in a restoration phase decided by the first hardware processor coincides with the first output value in the blocked phase following a change in the value of the input signal of the evaluation target from the second input value to the first input value, wherein the blocked phase is initiated upon detection of the change of the input value of the input signal from the first input value to the second input value, and the restoration phase is subsequent to the blocked phase and is initiated upon detection of the change of the input value of the input signal from the second input value to the first input value; and
    a visual output interface configured to output determination results of the second hardware processor in association with the corresponding input value of the input signal of the evaluation target.

2. The evaluation system according to claim 1, wherein the user input interface is further configured to present operation content for the input device of the evaluation target.

3. The evaluation system according to claim 2,
    wherein the user input interface is further configured
        to present operation content for changing the value of the input signal from the first input value to the second input value when the value of the input signal of the evaluation target is to be changed from the first input value to the second input value, and
        to present operation content for changing the value of the input signal from the second input value to the first input value when the value of the input device of the evaluation target is to be changed from the second input value to the first input value.

4. The evaluation system according to claim 2,
    wherein the operation content includes
        identification information of the evaluation target, and
        an operation procedure for the evaluation target.

5. The evaluation system according to claim 3,
    wherein the operation content includes
        identification information of the evaluation target, and
        an operation procedure for the evaluation target.

6. The evaluation system according to claim 2, wherein the evaluation condition includes a plurality of sets each including the value of the input signal of the evaluation target and the expected output value, and
    the user input interface is configured to successively present operation content of the evaluation target to be operated in accordance with an evaluation order set in advance.

7. The evaluation system according to claim 3, wherein
the evaluation condition includes a plurality of sets each including the value of the input signal of the evaluation target and the expected output value, and
the user input interface is configured to successively present operation content of the evaluation target to be operated in accordance with an evaluation order set in advance.

8. The evaluation system according to claim 4, wherein
the evaluation condition includes a plurality of sets each including the value of the input signal of the evaluation target and the expected output value, and
the user input interface is configured to successively present operation content of the evaluation target to be operated in accordance with an evaluation order set in advance.

9. The evaluation system according to claim 5, wherein
the evaluation condition includes a plurality of sets each including the value of the input signal of the evaluation target and the expected output value, and
the user input interface is configured to successively present operation content of the evaluation target to be operated in accordance with an evaluation order set in advance.

10. The evaluation system according to claim 1, wherein
the evaluation condition includes any one setting of a first type and a second type, wherein the first type indicates that the output value of the corresponding output signal is to be returned to an original value in conjunction with the value of the input signal being returned from the second input value to the first input value, and the second type indicates that the output value of the output signal is not to be returned to the original value until a reset condition set in advance is satisfied, and
the second hardware processor is configured to
determine the second output value is different from the first output value as normal in a case in which the first type is set, and
determine the second output value coincides with the first output value as normal in a case in which the second type is set.

11. The evaluation system according to claim 2, wherein
the evaluation condition includes any one setting of a first type and a second type, wherein the first type indicates that the output value of the corresponding output signal is to be returned to an original value in conjunction with the value of the input signal being returned from the second input value to the first input value, and the second type indicates that the output value of the output signal is not to be returned to the original value until a reset condition set in advance is satisfied, and
the second hardware processor is configured to
determine the second output value is different from the first output value as normal in a case in which the first type is set, and
determine the second output value coincides with the first output value as normal in a case in which the second type is set.

12. The evaluation system according to claim 3, wherein
the evaluation condition includes any one setting of a first type and a second type, wherein the first type indicates that the output value of the corresponding output signal is to be returned to an original value in conjunction with the value of the input signal being returned from the second input value to the first input value, and the second type indicates that the output value of the output signal is not to be returned to the original value until a reset condition set in advance is satisfied, and
the second hardware processor is configured to
determine the second output value is different from the first output value as normal in a case in which the first type is set, and
determine the second output value coincides with the first output value as normal in a case in which the second type is set.

13. The evaluation system according to claim 4, wherein
the evaluation condition includes any one setting of a first type and a second type, wherein the first type indicates that the output value of the corresponding output signal is to be returned to an original value in conjunction with the value of the input signal being returned from the second input value to the first input value, and the second type indicates that the output value of the output signal is not to be returned to the original value until a reset condition set in advance is satisfied, and
the second hardware processor is configured to
determine the second output value is different from the first output value as normal in a case in which the first type is set, and
determine the second output value coincides with the first output value as normal in a case in which the second type is set.

14. The evaluation system according to claim 5, wherein
the evaluation condition includes any one setting of a first type and a second type, wherein the first type indicates that the output value of the corresponding output signal is to be returned to an original value in conjunction with the value of the input signal being returned from the second input value to the first input value, and the second type indicates that the output value of the output signal is not to be returned to the original value until a reset condition set in advance is satisfied, and
the second hardware processor is configured to
determine the second output value is different from the first output value as normal in a case in which the first type is set, and
determine the second output value coincides with the first output value as normal in a case in which the second type is set.

15. The evaluation system according to claim 6, wherein
the evaluation condition includes any one setting of a first type and a second type, wherein the first type indicates that the output value of the corresponding output signal is to be returned to an original value in conjunction with the value of the input signal being returned from the second input value to the first input value, and the second type indicates that the output value of the output signal is not to be returned to the original value until a reset condition set in advance is satisfied, and
the second hardware processor is configured to
determine the second output value is different from the first output value as normal in a case in which the first type is set, and
determine the second output value coincides with the first output value as normal in a case in which the second type is set.

16. The evaluation system according to claim 7, wherein
the evaluation condition includes any one setting of a first type and a second type, wherein the first type indicates that the output value of the corresponding output signal is to be returned to an original value in conjunction with the value of the input signal being returned from the second input value to the first input value, and the second type indicates that the output value of the output signal is not to be returned to the original value until a reset condition set in advance is satisfied, and the second hardware processor is configured to
- determine the second output value is different from the first output value as normal in a case in which the first type is set, and
- determine the second output value coincides with the first output value as normal in a case in which the second type is set.

17. The evaluation system according to claim 8, wherein the evaluation condition includes any one setting of a first type and a second type, wherein the first type indicates that the output value of the corresponding output signal is to be returned to an original value in conjunction with the value of the input signal being returned from the second input value to the first input value, and the second type indicates that the output value of the output signal is not to be returned to the original value until a reset condition set in advance is satisfied, and the second hardware processor is configured to
- determine the second output value is different from the first output value as normal in a case in which the first type is set, and
- determine the second output value coincides with the first output value as normal in a case in which the second type is set.

18. The evaluation system according to claim 1, comprising a safety controller, wherein the first hardware processor, the second hardware processor, the user input interface and the output interface are collectively implemented in the safety controller, wherein the safety controller is an independent hardware device.

19. A non-transitory computer readable storage medium that evaluates functional safety for a safety program for causing one or more output devices to perform a safety operation on a controlled apparatus if an input signal is generated from any one or more input devices, wherein the any one or more input devices comprise one or more of a detection device that detects the presence or intrusion of persons and a device that receives operations in an emergency, and the one or more input devices generating the input signal are referred to as an evaluation target, the non-transitory computer readable storage medium storing a plurality of program instructions, wherein the program instructions are loaded into a computer to execute the following:

deciding a value of an output signal to be output to one or more corresponding output devices by executing computation in accordance with a commands included in the safety program, on the basis of the input signal from the any one of one or more input devices, wherein the input devices detect sensed signals and the input device generating the input signal is referred to as an evaluation target;

receiving an evaluation condition that includes an input value of the input signal from the evaluation target and an expected output value, wherein the expected output value is an expected value of the output signal to be output to the one or more output devices and corresponds to the input value;

determining whether or not a first output value of the output signal in a blocked phase decided by computation in accordance with commands included in the safety program coincides with the expected output value following a change in the value of the input signal of the evaluation target from a first input value to a second input value, wherein the blocked phase is initiated upon detection of the change of the input value of the input signal from the first input value to the second input value;

determining whether or not a second output value of the output signal in a restoration phase decided by the computation in accordance with commands included in the safety program coincides with the first output value in the blocked phase following a change in the value of the input signal of the evaluation target from the second input value to the first input value, wherein the restoration phase is subsequent to the blocked phase and is initiated upon detection of the change of the input value of the input signal from the second input value to the first input value; and outputting on a visual output interface determination results of the determining step in association with the corresponding input value of the input signal of the evaluation target.

20. An evaluation method that evaluates functional safety for a safety program for causing one or more output devices to perform a safety operation on a controlled apparatus if an input signal is generated from any one or more input devices, wherein the any one or more input devices comprise one or more of a detection device that detects the presence or intrusion of persons and a device that receives operations in an emergency, and the one or more input devices generating the input signal are referred to as an evaluation target, the evaluation method comprising:

deciding a value of an output signal to be output to one or more corresponding output devices by executing computation in accordance with a commands included in the safety program, on the basis of the input signal from the any one of one or more input devices, wherein the input devices detect sensed signals and the input device generating the input signal is referred to as an evaluation target;

receiving an evaluation condition that includes an input value of the input signal from the evaluation target and an expected output value, wherein the expected output value is an expected value of the output signal to be output to the one or more output devices and corresponds to the input value;

determining whether or not a first output value of the output signal in a blocked phase decided by computation in accordance with commands included in the safety program coincides with the expected output value following a change in the value of the input signal of the evaluation target from a first input value to a second input value, wherein the blocked phase is initiated upon detection of the change of the input value of the input signal from the first input value to the second input value;

determining whether or not a second output value of the output signal in a restoration phase decided by the computation in accordance with commands included in the safety program coincides with the first output value in the blocked phase following a change in the value of the input signal of the evaluation target from the second input value to the first input value, wherein the restoration phase is subsequent to the blocked phase and is initiated upon detection of the change of the input value of the input signal from the second input value to the first input value; and outputting on a visual output interface determination results of the determining step in association with the corresponding input value of the input signal of the evaluation target.

* * * * *